(12) United States Patent
Yu et al.

(10) Patent No.: US 12,192,140 B2
(45) Date of Patent: Jan. 7, 2025

(54) EFFICIENT DOWNLINK CONTROL INFORMATION TRANSMISSION IN MOBILE COMMUNICATION NETWORKS

(71) Applicant: HUAWEI TECHNOLOGIES CO., LTD., Guangdong (CN)

(72) Inventors: Yawei Yu, Shenzhen (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 381 days.

(21) Appl. No.: 17/588,987

(22) Filed: Jan. 31, 2022

(65) Prior Publication Data

US 2022/0158779 A1    May 19, 2022

Related U.S. Application Data

(63) Continuation of application No. PCT/CN2020/103317, filed on Jul. 21, 2020.

(30) Foreign Application Priority Data

Jul. 31, 2019    (CN) ......................... 201910704667.2

(51) Int. Cl.
*H04L 5/00*        (2006.01)
*H04W 72/23*      (2023.01)

(52) U.S. Cl.
CPC ............. *H04L 5/005* (2013.01); *H04W 72/23* (2023.01)

(58) Field of Classification Search
CPC ......... H04L 5/005; H04L 5/0051; H04L 5/00; H04W 72/23; H04W 72/042; H04B 7/0452
See application file for complete search history.

(56) References Cited

U.S. PATENT DOCUMENTS

| 2013/0070693 A1* | 3/2013 | Kwon | .................... H04L 5/0055 370/329 |
| 2013/0178220 A1* | 7/2013 | Lee | ........................ H04W 72/23 455/450 |
| 2015/0244439 A1 | 8/2015 | Nam et al. | |
| 2016/0249198 A1* | 8/2016 | Kim | ...................... H04W 48/16 |

(Continued)

FOREIGN PATENT DOCUMENTS

| CN | 102333381 A | 1/2012 |
| CN | 102523606 A | 6/2012 |
| CN | 103095444 A | 5/2013 |

(Continued)

OTHER PUBLICATIONS

Signaling of DMRS ports for SU/MU-MIMO Nagoya, Japan; Sep. 18, 2017 (Year: 2017).*

(Continued)

*Primary Examiner* — Mewale A Ambaye
(74) *Attorney, Agent, or Firm* — Fish & Richardson P.C.

(57) ABSTRACT

The present disclosure discloses example data transmission methods and apparatuses. One example method includes determining first downlink control information (DCI) by a network device. The first DCI is sent to n terminal devices by the network device, where the first DCI includes information for the n terminal devices to perform data transmission, and n is an integer greater than or equal to 2.

16 Claims, 5 Drawing Sheets

(56) References Cited

U.S. PATENT DOCUMENTS

| | | | |
|---|---|---|---|
| 2018/0167959 A1* | 6/2018 | Liao | H04W 72/121 |
| 2019/0013910 A1 | 1/2019 | Zhang et al. | |

FOREIGN PATENT DOCUMENTS

| | | | |
|---|---|---|---|
| CN | 103687034 A | | 3/2014 |
| CN | 105790814 A | | 7/2016 |
| CN | 106685494 A | | 5/2017 |
| CN | 107409295 A | | 11/2017 |
| CN | 107431682 A | | 12/2017 |
| CN | 107736065 A | | 2/2018 |
| CN | 108023699 A | | 5/2018 |
| CN | 108365938 A | | 8/2018 |
| CN | 108631988 A | | 10/2018 |
| CN | 109152050 A | | 1/2019 |
| CN | 109152074 A | | 1/2019 |
| CN | 109391359 A | | 2/2019 |
| CN | 109391398 A | | 2/2019 |
| CN | 109995498 A | | 7/2019 |
| JP | 2011142620 | * | 7/2011 |
| JP | 2011142620 | | 7/2011 |
| WO | 2016017038 A1 | | 2/2016 |
| WO | 2016134528 A1 | | 9/2016 |

OTHER PUBLICATIONS

Extended European Search Report issued in European Application No. 20845879.4 on Jul. 28, 2022, 11 pages.

Huawei, HiSilicon, "Signaling of DMRS ports for SU/MU-MIMO," 3GPP TSG RAN WG1 NRAd-Hoc#3, R1-1715599, Nagoya, Japan, Sep. 18-21, 2017, 14 pages.

3GPP TS 38.211 V15.6.0 (Jun. 2019), "3rd Generation Partnership Project; Technical Specification Group Radio Access Network; NR; Physical channels and modulation(Release 15)," Jun. 2019, 97 pages.

3GPP TS 38.212 V15.6.0 (Jun. 2019), "3rd Generation Partnership Project; Technical Specification Group Radio Access Network; NR; Multiplexing and channel coding(Release 15)," Jun. 2019, 101 pages.

3GPP TS 38.213 V15.6.0 (Jun. 2019), "3rd Generation Partnership Project; Technical Specification Group Radio Access Network; NR; Physical layer procedures for control(Release 15)," Jun. 2019, 107 pages.

3GPP TS 38.214 V15.6.0 (Jun. 2019), "3rd Generation Partnership Project; Technical Specification Group Radio Access Network; NR; Physical layer procedures for data(Release 15)," Jun. 2019, 105 pages.

Ericsson, "DCI content for MTC," 3GPP TSG RAN WG1 Meeting #80, R1-151208, Athens, Greece, Feb. 9-13, 2015, 4 pages.

Huawei, HiSilicon, "Design of DL DMRS for data transmission," 3GPP TSG RAN WG1 NR Ad-Hoc Meeting, R1-1700067, Spokane, USA, Jan. 16-20, 2017, 4 pages.

Huawei, HiSilicon, "Design of DL DMRS for data transmission," 3GPP TSG RAN WG1 Meeting #88, R1-1701692, Athens, Greece, Feb. 13-17, 2017, 5 pages.

Huawei, HiSilicon, "Signaling of DMRS ports for SU/MU-MIMO," 3GPP TSG RAN WG1 NR Ad Hoc Meeting, R1-1710455, Qingdao, China, Jun. 27-30, 2017, 6 pages.

Office Action issued in Chinese Application No. 201910704667.2 on Jun. 30, 2021, 16 pages.

Office Action issued in Chinese Application No. 201910704667.2 on Dec. 3, 2021, 15 pages (with English translation).

PCT International Search Report and Written Opinion issued in International Application No. PCT/CN2020/103317 on Oct. 12, 2020, 19 pages (with English translation).

ZTE, "Discussion on downlink DMRS design," 3GPP TSG RAN WG1 Meeting #90, R1-1712305, Prague, Czechia, Aug. 21-25, 2017, 10 pages.

* cited by examiner

EFFICIENT DOWNLINK CONTROL INFORMATION TRANSMISSION IN MOBILE COMMUNICATION NETWORKS

CROSS-REFERENCE TO RELATED APPLICATIONS

This application is a continuation of International Application No. PCT/CN2020/103317, filed on Jul. 21, 2020, which claims priority to Chinese Patent Application No. 201910704667.2, filed on Jul. 31, 2019. The disclosures of the aforementioned applications are hereby incorporated by reference in their entities.

TECHNICAL FIELD

This application relates to the field of communication technologies, and in particular, to a data transmission method, an apparatus, and a system.

BACKGROUND

In a multiple-input multiple-output (MIMO) system, a plurality of transmit antennas and receive antennas are respectively used at a transmit end and a receive end, to transmit and receive a signal by using the plurality of antennas at the transmit end and the receive end, to fully use space resources and improve communication quality, so that a system channel capacity is multiplied without increasing spectrum resources and antenna transmit power.

A multi-user MIMO (MU-MIMO) system is a MIMO system that simultaneously serves a plurality of terminal devices. Different terminal devices may send data to a base station by using a same time-frequency resource. Alternatively, a base station may send, to different terminal devices, a plurality of pieces of parallel data occupying a same time-frequency resource, to improve a total transmission rate of the multi-user MIMO system. The terminal devices that are simultaneously served are referred to as paired terminal devices. A quantity of pieces of data on which each terminal device performs parallel transmission is referred to as a quantity of layers (layer). Data at different layers may be mapped, through layer mapping, to different antenna ports for sending or receiving.

Regardless of whether the paired terminal devices send data on a physical uplink shared channel (PUSCH) or receive data on a physical downlink shared channel (PDSCH), configuration information (for example, a time-frequency resource position and a modulation scheme) required for data transmission needs to be indicated by correctly interpreting downlink control information (DCI) carried on a physical downlink control channel (PDCCH).

In a conventional technology, the base station may separately send DCI to each terminal device on the PDCCH to indicate the corresponding terminal device to perform data (for example, PDSCH and/or PUSCH) transmission. However, when the DCI is separately sent to the terminal device to indicate data transmission, total DCI resource overheads of the plurality of terminal devices may be excessively large.

SUMMARY

Embodiments of this application provide a data transmission method, an apparatus, and a system, to resolve a problem that total DCI overheads are excessively large when DCI is separately sent to a plurality of terminal devices to indicate data transmission.

To resolve the foregoing technical problem, the embodiments of this application provide the following technical solutions.

According to a first aspect, an embodiment of this application provides a data transmission method, including: determining, by a network device, first downlink control information; and sending, by the network device, the first downlink control information to n terminal devices, where the first downlink control information indicates the n terminal devices to perform data transmission, and n is an integer greater than or equal to 2.

This embodiment of this application provides the data transmission method. The network device sends the first downlink control information to the n terminal devices to indicate data transmission of the n terminal devices. Compared with a conventional technology in which downlink control information is separately sent to each terminal device for indication, this embodiment can reduce total bit overheads of sending downlink control information and improve system performance.

In a possible implementation, the first downlink control information includes demodulation reference signal DMRS antenna port indication information, and the DMRS antenna port indication information indicates a first sequence value corresponding to the n terminal devices. The network device indicates the first sequence values corresponding to the n terminal devices, so that the n terminal devices determine corresponding DMRS antenna port combinations.

In a possible implementation, the method provided in this embodiment of this application further includes: sending, by the network device, first information to the n terminal devices, where the first information includes a first correspondence table, and the first correspondence table includes a correspondence between at least one first sequence value, at least one second sequence value, and a DMRS antenna port. The network device may send the first correspondence table to the n terminal devices, so that the n terminal devices can determine the correspondence between the at least one first sequence value, the at least one second sequence value, and the DMRS antenna port based on the first correspondence table.

In a possible implementation, the method provided in this embodiment of this application further includes: sending, by the network device, second information to the n terminal devices, where the second information includes a value of n and a total quantity of layers of data on which the n terminal devices perform parallel transmission, the second information is used by the n terminal devices to determine a first correspondence table based on a predefined first relationship table set, the first relationship table set includes at least one first correspondence table, and the first correspondence table includes a correspondence between at least one first sequence value, at least one second sequence value, and a DMRS antenna port. The terminal device may determine the first correspondence table in the predefined first relationship table set based on the second information. A transmission resource used by the network device to send the second information can be saved by predefining the first correspondence table.

In a possible implementation, the method provided in this embodiment of this application further includes: sending, by the network device, first indication information to the n terminal devices, where the first indication information indicates a second sequence value corresponding to each of the n terminal devices. The terminal device can determine, in the first correspondence table by using the first sequence value and the second sequence value, a DMRS antenna port corresponding to the terminal device.

In a possible implementation, when frequency domain resources of the n terminal devices incompletely overlap, the n terminal devices include m target groups, frequency domain resources used by a terminal device in a same target group in the m target groups to perform data transmission are the same, frequency domain resources used by terminal devices in different target groups in the m target groups to perform data transmission are incompletely the same, and m is an integer greater than or equal to 2. The n terminal devices are grouped so that frequency domain resources used by a terminal device in each target group to perform data transmission are the same, to resolve a problem of downlink control information indication for the n terminal devices when the frequency domain resources of the n terminal devices incompletely overlap.

In a possible implementation, the first correspondence table further includes a correspondence between at least one group identifier and the DMRS antenna port, and the at least one group identifier corresponds to at least one target group. A DMRS antenna port corresponding to the target group can be determined by using the correspondence between the group identifier and the DMRS antenna port.

In a possible implementation, the method provided in this embodiment of this application further includes: sending, by the network device, a group identifier of a first target group to a terminal device in the first target group, where the group identifier is used to enable the terminal device that belongs to the first target group to determine that the terminal device belongs to the first target group, and the first target group is any one of the m target groups. The terminal device in the first target group can determine the first target group.

In a possible implementation, the first downlink control information includes second indication information, and the second indication information indicates frequency domain resources used when the n terminal devices perform data transmission. The frequency domain resources used when the n terminal devices perform data transmission can be determined.

In a possible implementation, when an allocation type of the frequency domain resources is discrete frequency domain resources, the second indication information includes at least one first bit and at least one second bit, the first bit indicates that a frequency domain resource associated with the first bit is available, and the second bit indicates that a frequency domain resource associated with the second bit is unavailable; or when an allocation type of the frequency domain resources is consecutive frequency domain resources, the second indication information includes a resource indication value, and the resource indication value is used to determine frequency domain resource start points and lengths of consecutive resource blocks in the frequency domain resources of the n terminal devices. A frequency domain resource indication problem when the frequency domain resources are discrete and consecutive can be resolved.

According to a second aspect, an embodiment of this application provides a data transmission method, including: receiving, by a terminal device, first downlink control information from a network device, where the first downlink control information indicates n terminal devices to perform data transmission, n is an integer greater than or equal to 2, and the terminal device is any one of the n terminal devices; and performing, by the terminal device, data transmission with the network device based on the first downlink control information.

This embodiment of this application provides the data transmission method. The n terminal devices determine, by receiving the first downlink control information, data transmission modes respectively corresponding to the n terminal devices. Compared with a conventional technology in which each terminal device is separately indicated by using downlink control information, this embodiment can reduce bit overheads of the downlink control information and improve system performance.

In a possible implementation, the first downlink control information includes demodulation reference signal DMRS antenna port indication information, and the DMRS antenna port indication information indicates a first sequence value corresponding to the n terminal devices.

In a possible implementation, the method provided in this embodiment of this application further includes: receiving, by the terminal device, first information from the network device, where the first information includes a first correspondence table, and the first correspondence table includes a correspondence between at least one first sequence value, at least one second sequence value, and a DMRS antenna port.

In a possible implementation, the method provided in this embodiment of this application further includes: receiving, by the terminal device, second information from the network device, where the second information includes a value of n and a total quantity of layers of data on which the n terminal devices perform parallel transmission; and determining, by the terminal device, a first correspondence table in a predefined first relationship table set based on the second information.

In a possible implementation, the method provided in this embodiment of this application further includes: receiving, by the terminal device, first indication information from the network device, where the first indication information indicates a second sequence value corresponding to each of the n terminal devices; and determining, by the terminal device in the first correspondence table based on the first sequence value and the second sequence value, a DMRS antenna port corresponding to the terminal device.

In a possible implementation, when frequency domain resources of the n terminal devices incompletely overlap, the n terminal devices include m target groups, frequency domain resources used by a terminal device in a same target group in the m target groups to perform data transmission are the same, frequency domain resources used by terminal devices in different target groups in the m target groups to perform data transmission are incompletely the same, and m is an integer greater than or equal to 2.

In a possible implementation, the first correspondence table further includes a correspondence between at least one group identifier and the DMRS antenna port.

In a possible implementation, the method provided in this embodiment of this application further includes: receiving, by the terminal device, a group identifier of a first target group from the network device, where the group identifier is used to enable a terminal device that belongs to the first target group to determine that the terminal device belongs to the first target group, and the first target group is any one of the m target groups; and determining, by the terminal device based on the group identifier, that the terminal device belongs to the first target group.

In a possible implementation, the first downlink control information includes second indication information, and the second indication information indicates frequency domain resources used when the n terminal devices perform data transmission.

In a possible implementation, when an allocation type of the frequency domain resources is discrete frequency domain resources, the second indication information includes at least one first bit and at least one second bit, the first bit indicates that a frequency domain resource associated with the first bit is available, and the second bit indicates that a frequency domain resource associated with the second bit is unavailable; or when an allocation type of the frequency domain resources is consecutive frequency domain resources, the second indication information includes a resource indication value, and the resource indication value is used to determine frequency domain resource start points and lengths of consecutive resource blocks in the frequency domain resources of the n terminal devices.

According to a third aspect, an embodiment of this application provides a data transmission apparatus. The data transmission apparatus can implement the method according to any one of the first aspect or the possible implementations of the first aspect, and therefore can further implement beneficial effects in any one of the first aspect or the possible implementations of the first aspect. The data transmission apparatus may be a network device, or may be an apparatus that can support the network device in implementing the method according to any one of the first aspect or the possible implementations of the first aspect, for example, a chip used in the network device. The apparatus may implement the foregoing method by using software, hardware, or hardware executing corresponding software.

In an example, this embodiment of this application provides a data transmission apparatus, including: a processing unit, configured to determine first downlink control information; and a communication unit, configured to send the first downlink control information to n terminal devices, where the first downlink control information indicates the n terminal devices to perform data transmission, and n is an integer greater than or equal to 2.

In a possible implementation, the first downlink control information includes demodulation reference signal DMRS antenna port indication information, and the DMRS antenna port indication information indicates a first sequence value corresponding to the n terminal devices.

In a possible implementation, the communication unit is further configured to send first information to the n terminal devices, where the first information includes a first correspondence table, and the first correspondence table includes a correspondence between at least one first sequence value, at least one second sequence value, and a DMRS antenna port.

In a possible implementation, the communication unit is further configured to send second information to the n terminal devices, where the second information includes a value of n and a total quantity of layers of data on which the n terminal devices perform parallel transmission, the second information is used by the n terminal devices to determine a first correspondence table based on a predefined first relationship table set, the first relationship table set includes at least one first correspondence table, and the first correspondence table includes a correspondence between at least one first sequence value, at least one second sequence value, and a DMRS antenna port.

In a possible implementation, the communication unit is further configured to send first indication information to the n terminal devices, where the first indication information indicates a second sequence value corresponding to each of the n terminal devices.

In a possible implementation, when frequency domain resources of the n terminal devices incompletely overlap, the n terminal devices include m target groups, frequency domain resources used by a terminal device in a same target group in the m target groups to perform data transmission are the same, frequency domain resources used by terminal devices in different target groups in the m target groups to perform data transmission are incompletely the same, and m is an integer greater than or equal to 2.

In a possible implementation, the first correspondence table further includes a correspondence between at least one group identifier and the DMRS antenna port, and the at least one group identifier corresponds to at least one target group.

In a possible implementation, the communication unit is further configured to send a group identifier of a first target group to a terminal device in the first target group, where the group identifier is used to enable the terminal device that belongs to the first target group to determine that the terminal device belongs to the first target group, and the first target group is any one of the m target groups.

In a possible implementation, the first downlink control information includes second indication information, and the second indication information indicates frequency domain resources used when the n terminal devices perform data transmission.

In a possible implementation, when an allocation type of the frequency domain resources is discrete frequency domain resources, the second indication information includes at least one first bit and at least one second bit, the first bit indicates that a frequency domain resource associated with the first bit is available, and the second bit indicates that a frequency domain resource associated with the second bit is unavailable; or when an allocation type of the frequency domain resources is consecutive frequency domain resources, the second indication information includes a resource indication value, and the resource indication value is used to determine frequency domain resource start points and lengths of consecutive resource blocks in the frequency domain resources of the n terminal devices.

In another example, this embodiment of this application provides a data transmission apparatus. The data transmission apparatus may be a network device, or may be a chip in the network device. The data transmission apparatus may include a communication unit and a processing unit. When the data transmission apparatus is a network device, the communication unit may be a communication interface or an interface circuit, and the processing unit may be a processor. The processing unit executes instructions stored in a storage unit, to enable the data transmission apparatus to implement the method according to any one of the first aspect or the possible implementations of the first aspect. When the data transmission apparatus is a chip in the network device, the processing unit may be a processor, and the communication unit may be collectively referred to as a communication interface.

Optionally, the processor, the communication interface, and a memory are coupled to each other.

According to a fourth aspect, an embodiment of this application provides a data transmission apparatus. The data transmission apparatus can implement the method according to any one of the second aspect or the possible implementations of the second aspect, and therefore can further implement beneficial effects in any one of the second aspect or the possible implementations of the second aspect. The communication apparatus may be a terminal device, or may be an apparatus that can support the terminal device in implementing the method according to any one of the second aspect or the possible implementations of the second aspect, for example, a chip used in the terminal device. The apparatus may implement the foregoing method by using software, hardware, or hardware executing corresponding software.

In an example, this embodiment of this application provides a data transmission apparatus. The data transmission apparatus includes: a communication unit, configured to receive first downlink control information from a network device, where the first downlink control information indicates n terminal devices to perform data transmission, n is an integer greater than or equal to 2, and the terminal device is any one of the n terminal devices, where the communication unit is further configured to perform data transmission with the network device based on the first downlink control information.

In a possible implementation, the first downlink control information includes demodulation reference signal DMRS antenna port indication information, and the DMRS antenna port indication information indicates a first sequence value corresponding to the n terminal devices.

In a possible implementation, the communication unit is further configured to receive first information from the network device, where the first information includes a first correspondence table, and the first correspondence table includes a correspondence between at least one first sequence value, at least one second sequence value, and a DMRS antenna port.

In a possible implementation, the communication unit is further configured to receive second information from the network device, where the second information includes a value of n and a total quantity of layers of data on which the n terminal devices perform parallel transmission; and the apparatus further includes: a processing unit, configured to determine a first correspondence table in a predefined first relationship table set based on the second information, where the first relationship table set includes at least one first correspondence table.

In a possible implementation, the communication unit is further configured to receive first indication information from the network device, where the first indication information indicates a second sequence value corresponding to each of the n terminal devices; and the processing unit is further configured to determine, in the first correspondence table based on the first sequence value and the second sequence value, a DMRS antenna port corresponding to the terminal device.

In a possible implementation, when frequency domain resources of the n terminal devices incompletely overlap, the n terminal devices include m target groups, frequency domain resources used by a terminal device in a same target group in the m target groups to perform data transmission are the same, frequency domain resources used by terminal devices in different target groups in the m target groups to perform data transmission are incompletely the same, and m is an integer greater than or equal to 2.

In a possible implementation, the first correspondence table further includes a correspondence between at least one group identifier and the DMRS antenna port, and the at least one group identifier corresponds to at least one target group.

In a possible implementation, the communication unit is further configured to receive a group identifier of a first target group from the network device, where the group identifier is used to enable a terminal device that belongs to the first target group to determine that the terminal device belongs to the first target group, and the first target group is any one of the m target groups; and the processing unit is further configured to determine, based on the group identifier, that the terminal device belongs to the first target group.

In a possible implementation, the first downlink control information includes second indication information, and the second indication information indicates frequency domain resources used when the n terminal devices perform data transmission.

In a possible implementation, when an allocation type of the frequency domain resources is discrete frequency domain resources, the second indication information includes at least one first bit and at least one second bit, the first bit indicates that a frequency domain resource associated with the first bit is available, and the second bit indicates that a frequency domain resource associated with the second bit is unavailable; or when an allocation type of the frequency domain resources is consecutive frequency domain resources, the second indication information includes a resource indication value, and the resource indication value is used to determine frequency domain resource start points and lengths of consecutive resource blocks in the frequency domain resources of the n terminal devices.

In another example, this embodiment of this application provides a data transmission apparatus. The data transmission apparatus may be a terminal device, or may be a chip in the terminal device. The data transmission apparatus may include a communication unit and a processing unit. When the data transmission apparatus is a terminal device, the communication unit may be a communication interface or an interface circuit, the data transmission apparatus may further include a storage unit, and the processing unit may be a processor. The processing unit executes instructions stored in the storage unit, to enable the data transmission apparatus to implement the method according to any one of the second aspect or the possible implementations of the second aspect. When the data transmission apparatus is a chip in the terminal device, the processing unit may be a processor, and the communication unit may be collectively referred to as a communication interface. The processing unit executes computer program code stored in a storage unit, to enable the terminal device to implement the method according to any one of the second aspect or the possible implementations of the second aspect.

Optionally, the processor, the communication interface, and a memory are coupled to each other.

According to a fifth aspect, an embodiment of this application provides a computer-readable storage medium. The computer-readable storage medium stores a computer program or instructions. When the computer program or the instructions are run on a computer, the computer is enabled to perform the data transmission method according to any one of the first aspect or the possible implementations of the first aspect.

According to a sixth aspect, an embodiment of this application provides a computer-readable storage medium. The computer-readable storage medium stores a computer program or instructions. When the computer program or the instructions are run on a computer, the computer is enabled to perform the data transmission method according to any one of the second aspect or the possible implementations of the second aspect.

According to a seventh aspect, an embodiment of this application provides a computer program product including instructions. When the instructions are run on a computer, the computer is enabled to perform the data transmission method according to any one of the first aspect or the possible implementations of the first aspect.

According to an eighth aspect, this application provides a computer program product including instructions. When the instructions are run on a computer, the computer is enabled to perform the data transmission method according to any one of the second aspect or the possible implementations of the second aspect.

According to a ninth aspect, an embodiment of this application provides a communication apparatus. The communication apparatus includes a processor and a memory. The memory stores instructions. When the instructions are run by the processor, the data transmission method according to any one of the first aspect or the possible implementations of the first aspect is implemented.

According to a tenth aspect, an embodiment of this application provides a communication apparatus. The communication apparatus includes a processor and a memory. The memory stores instructions. When the instructions are run by the processor, the data transmission method according to any one of the second aspect or the possible implementations of the second aspect is implemented.

According to an eleventh aspect, an embodiment of this application provides a communication apparatus. The communication apparatus includes one or more modules, configured to implement the methods according to the first aspect and the second aspect, and the one or more modules may correspond to the steps in the methods according to the first aspect and the second aspect.

According to a twelfth aspect, an embodiment of this application provides a chip. The chip includes a processor and a communication interface. The communication interface is coupled to the processor. The processor is configured to run a computer program or instructions, to implement the data transmission method according to any one the first aspect or the possible implementations of the first aspect. The communication interface is configured to communicate with another module other than the chip.

According to a thirteenth aspect, an embodiment of this application provides a chip. The chip includes a processor and a communication interface. The communication interface is coupled to the processor. The processor is configured to run a computer program or instructions, to implement the data transmission method according to any one the second aspect or the possible implementations of the second aspect. The communication interface is configured to communicate with another module other than the chip.

Specifically, the chip provided in this embodiment of this application further includes a memory, configured to store the computer program or the instructions.

According to a fourteenth aspect, an embodiment of this application provides a communication system. The communication system includes any one or more of the following: the data transmission apparatus according to any one of the third aspect or the possible implementations and the data transmission apparatus according to any one of the fourth aspect or the possible implementations of the fourth aspect.

Any apparatus, computer-readable storage medium, computer program product, or chip provided above is configured to perform the corresponding method provided above. Therefore, for beneficial effects that can be achieved by the apparatus, computer-readable storage medium, computer program product, or chip, refer to the beneficial effects of the corresponding solution in the corresponding method provided above. Details are not described herein again.

DESCRIPTION OF EMBODIMENTS

Figure 1:
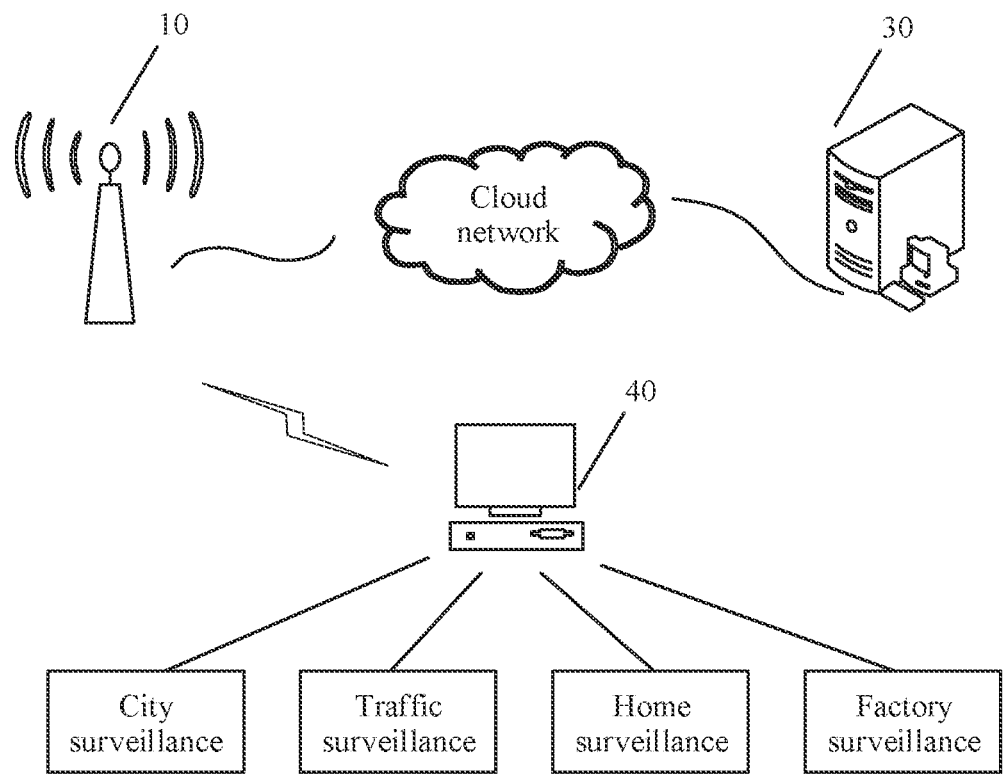
FIG. 1 is a schematic diagram of an application scenario of a communication system used in an embodiment of this application.

The term "at least one" in the embodiments of this application includes one or more. "A plurality of" means two or more. For example, at least one of A, B, and C includes: Only A exists, only B exists, both A and B exist, both A and C exist, both B and C exist, and all of A, B, and C exist. In this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists. "A plurality of" means two or more.

To clearly describe the technical solutions in embodiments of this application, terms such as "first" and "second" are used in the embodiments of this application to distinguish between same items or similar items that have basically same functions and effects. A person skilled in the art may understand that the terms such as "first" and "second" do not limit a quantity or an execution sequence, and the terms such as "first" and "second" do not indicate a definite difference.

It should be noted that, in this application, the word such as "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word such as "exemplary" or "for example" is intended to present a related concept in a specific manner.

The technical solutions in the embodiments of this application may be applied to various communication systems, for example, code division multiple access (CDMA), time division multiple access (TDMA), frequency division multiple access (FDMA), orthogonal frequency division multiple access (OFDMA), single carrier frequency division multiple access (single carrier FDMA, SC-FDMA), and another system. Terms "system" and "network" may be interchanged with each other. The CDMA system may implement wireless technologies such as universal terrestrial radio access (UTRA) and CDMA2000. UTRA may include a wideband CDMA (WCDMA) technology and another variant technology of CDMA. CDMA2000 may cover interim standard (IS) 2000 (IS-2000), IS-95 standard, and IS-856 standards. The TDMA system may implement a wireless technology such as a global system for mobile communications (GSM). The OFDMA system may implement wireless technologies such as evolved universal terrestrial radio access (evolved UTRA, E-UTRA), ultra mobile broadband (UMB), IEEE 802.11 (Wi-Fi), IEEE 802.16 (WiMAX), IEEE 802.20, and Flash OFDMA. UTRA corresponds to a universal mobile telecommunications service (UMTS), and E-UTRA corresponds to an evolved version of the UMTS. Various versions of 3GPP in long term evolution (LTE) and LTE-based evolution are new versions of the UMTS using E-UTRA. A 5G communication system and new radio (NR) are next-generation communication systems under research. In addition, the communication systems may be further applied to a future-oriented communication technology, and are all applicable to the technical solutions provided in the embodiments of this application.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of a network architecture and emergence of a new service scenario, the technical solutions provided in the embodiments of this application are also applicable to similar technical problems. The embodiments of this application are described by using an example in which a provided method is applied to an NR system or a 5G network.

In a 5G communication era, massive machine-type communications (mMTC) is one of main application scenarios in the NR system. For a quasi-static channel, because positions of scatterers in a network device, a terminal device, and the channel basically remain unchanged, an uplink wireless channel from the terminal device to the network device also basically remains unchanged in a period of time at a level of hundreds of milliseconds.

For example, for an application scenario such as video surveillance of a high-end terminal, refer to FIG. 1. In this application scenario, a surveillance terminal 40 may transmit, to a network device 10 in an uplink, service data generated through city surveillance, traffic surveillance, home surveillance, and factory surveillance. The network device 10 communicates with a local server 30 by using a cloud network. Because a data packet of a service such as a video is relatively large, data transmission is relatively stable, and a plurality of surveillance terminals work in a same frequency band range for a long time, a multi-user surveillance terminal formed by a plurality of video backhaul cameras does not change within preset time after pairing is completed. A multi-user MIMO system in the embodiments of this application may include a quasi-static channel system similar to the foregoing application scenario such as video surveillance.

Figure 2:
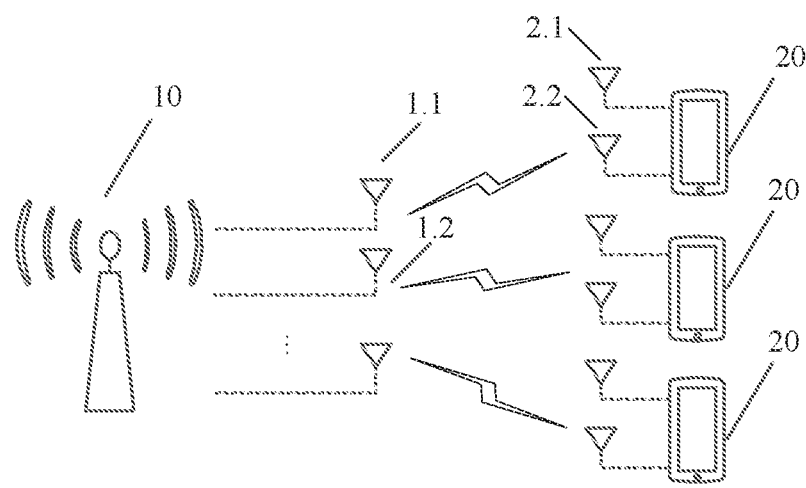
FIG. 2 is a schematic diagram of a structure of a communication system used in an embodiment of this application.

FIG. 2 is a schematic diagram of a structure of a communication system according to an embodiment of this application. The communication system is an MU-MIMO system, and includes a network device 10 and one or more terminal devices 20 that communicate with the network device 10.

Each of the one or more terminal devices 20 in this embodiment of this application has one or more antenna ports (port) (for example, DMRS antenna ports), and the network device 10 also has one or more antenna ports. Each antenna port may be configured to receive data, or may be configured to send data. For example, when the terminal device 20 sends uplink data to the network device 10, all or a part of the one or more antenna ports of the terminal device 20 may be used to send the data. Correspondingly, when the terminal device 20 receives downlink data from the network device 10, all or a part of the one or more antenna ports of the terminal device 20 may be used to receive the data.

It should be noted that, unless otherwise described, each antenna port in this embodiment of this application represents a DMRS antenna port.

Each terminal device may send uplink data to the network device 10 by using the antenna port of the terminal device, and the network device 10 may receive the uplink data from the terminal device by using the one or more antenna ports (for example, a port 1.1 and a port 1.2), and send downlink data to the terminal device by using one or more antenna ports. The terminal device may further receive the downlink data from the network device 10 by using the antenna ports (for example, a port 2.1 and a port 2.2) of the terminal device.

The network device 10 and the one or more terminal devices 20 may communicate with each other by using a MIMO technology. Different terminal devices 20 in the one or more terminal devices 20 may send uplink data to the network device 10 by using a same time-frequency resource. Alternatively, the network device may send a plurality of pieces of parallel downlink data occupying a same time-frequency resource to the one or more terminal devices 20, to improve a multi-user transmission rate. The one or more served terminal devices 20 may be referred to as paired terminal devices (Paired UE). A quantity of pieces of data on which each terminal device performs parallel transmission is referred to as a quantity of layers (Layer). Data at different layers is mapped, through layer mapping, to different antenna ports for sending or receiving. A MIMO system that simultaneously serves a plurality of users is referred to as multi-user MIMO MU-MIMO) system.

The paired terminal devices may send the uplink data to the network device 10 on a PUSCH, or receive the downlink data from the network device on a physical downlink shared channel PDSCH.

When receiving the downlink data, the terminal device 20 needs to learn of scheduling information, for example, a time-frequency resource allocation position and a modulation and coding scheme, configured by the network device 10 for the terminal device 20. Likewise, when the terminal device 20 is authorized to transmit the uplink data to the network device 10, the terminal device 20 also needs to send data based on the corresponding position and the modulation and coding scheme that are indicated by using the scheduling information indicated by the network device 10. All the scheduling information belongs to downlink control information (DCI). Therefore, the terminal device 20 needs to indicate and schedule the scheduling information by correctly interpreting DCI carried on a PDCCH.

Each downlink subframe includes a control region and a data region. Generally, the control region is located on the first one to three symbols in 14 orthogonal frequency division multiplexing (OFDM) symbols in the downlink subframe. (When a system bandwidth is 1.4 MHz, four OFDM symbols may be occupied) to transmit downlink control signaling such as the DCI. A channel type corresponding to the downlink control signaling includes the PDCCH carrying the DCI.

Figure 3:
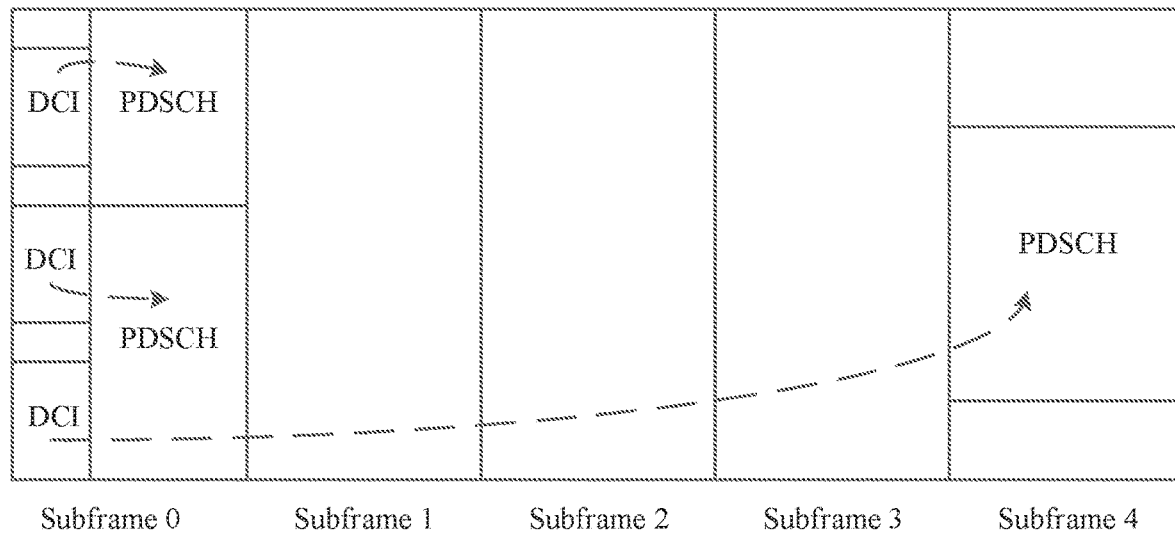
FIG. 3 is a schematic diagram of indicating data transmission by using downlink control information according to an embodiment of this application.

Refer to FIG. 3. The control area includes a plurality of PDCCH channels, a plurality of pieces of DCI may be configured in one subframe of the PDCCH channel, and a field configured in the DCI may be used to indicate correct transmission of a PDSCH or a PUSCH. When indication overheads of the DCI are larger, less time-frequency resources are used for data transmission in a same subframe. Therefore, DCI overheads need to be reduced as much as possible, and time-frequency resources need to be fully used for transmission of valid data.

In an MU-MIMO system, a network device may determine, based on received feedbacks (for example, channel state information (CSI) or a channel quality indicator (CQI)) on a downlink channel from a plurality of terminal devices, a related algorithm on a network device side, and the like, a quantity of optimal paired terminal devices in a current channel state, a quantity of layers of data on which each paired terminal device performs parallel transmission, and the like. A plurality of paired terminal devices may occupy a same time-frequency resource, or may occupy the same time domain resource but occupy frequency domain resources that are incompletely the same (the occupied frequency domain resources may be completely different, or may be partially the same). Through utilization of space resources, parallel transmission of a plurality of terminal devices is implemented, and a parallel transmission capability and a channel capacity of the system are improved. In a 5G NR system, to ensure data transmission flexibility, the network device separately allocates DCI to each terminal device on a PDCCH to indicate a corresponding user terminal to perform PDSCH and/or PUSCH transmission. Consequently, total DCI overheads of the plurality of terminal devices are relatively large, and transmission of valid data on the same time-frequency resource is reduced.

Specifically, in the NR system, according to different usages of DCI, the DCI may include indication fields in eight different formats (Format), and different indication fields indicate transmission of a corresponding PDSCH or PUSCH data channel. Table 1 lists the eight different formats and corresponding usages thereof.

TABLE 1

DCI formats and usages

| DCI Format | Usage |
| --- | --- |
| Format 0_0 | Schedule correct transmission of a PUSCH in a cell |
| Format 0_1 | Schedule correct transmission of the PUSCH in the cell |
| Format 1_0 | Schedule correct receiving of a PDSCH in the cell |
| Format 1_1 | Schedule correct receiving of the PDSCH in the cell |
| Format 2_0 | Notify slot formats of a group of users |
| Format 2_1 | Notify physical resource blocks PRBs and OFDM symbols of the group of users |

TABLE 1-continued

DCI formats and usages

| DCI Format | Usage |
| --- | --- |
| Format 2_2 | Send a transmit power control instruction of a PUCCH and the PUSCH |
| Format 2_3 | Send a transmit power control instruction used for uplink sounding signal transmission of one or more users |

In this embodiment of this application, DCI Format 0_1 for scheduling PUSCH transmission is used as an example for description. A parameter configuration in the DCI includes the following.

1. DCI format indicator: occupies one bit. When a value of the field is 0, it indicates that the DCI is a scheduling indication for PUSCH data transmission. When a value of the field is 1, it indicates that the DCI is a scheduling indication for PDSCH data transmission.

2. Subcarrier indicator: occupies zero bits or three bits.

3. Bandwidth part (BWP) indicator: occupies zero bits, one bit, or two bits. If the BWP indicator indicates that a quantity of uplink BWPs configured by higher layers is kBW, the BWP indicator occupies $\lceil \log_2(k_{BWP}) \rceil$ bits, where the symbol $\lceil \ \rceil$ represents rounding up.

When the quantity of BWPs (excluding an initial BWP) configured by the higher layers does not exceed 3, a BWP identifier (for example, a BWP-ID) is used for indication, and a corresponding BWP is selected from a configured BWP set based on BWP-ID configured by using higher layer signaling, where a total quantity of BWPs is equal to $k_{BWP}+1$.

When the quantity of BWPs (excluding an initial BWP) configured by the higher layers exceeds 3, a bit value of the BWP indicator is selected from a predefined table by using a separate DCI instruction.

Table 2 is a possible representation form of the predefined table. When the quantity of BWPs configured by the higher layers is 4, a BWP is determined, by using a field in the DCI, in a BWP set configured by using higher layer signaling. For example, if a value of a BWP indicator field in the DCI is 00, the first BWP is valued.

TABLE 2

| Value of a BWP indicator field (Value of BWP indicator field) Two bits | Bandwidth part |
| --- | --- |
| 00 | First BWP in a BWP set configured by higher layers (First bandwidth part configured by higher layers) |
| 01 | Second BWP in the BWP set configured by the higher layers (Second bandwidth part configured by higher layers) |
| 10 | Third BWP in the BWP set configured by the higher layers (Third bandwidth part configured by higher layers) |
| 11 | Fourth BWP in the BWP set configured by the higher layers (Fourth bandwidth part configured by higher layers) |

4. Time Domain Resource Allocation Indicator:

When the DCI is used to schedule the PUSCH to send a transport block (transmit block, TB), m+1 may be determined as a row index based on a value m of a field time-domain-resource-assignment in the DCI, where m is an integer greater than or equal to 0. A slot offset value K2, a start slot position S, a length L of consecutive symbols, and a PUSCH mapping type that correspond to an $(m+1)^{th}$ row are selected from the predefined table, to determine time domain resource allocation. Alternatively, time domain resource allocation may be determined by using pusch-Allocationlist in higher layer signaling pusch-ConfigCommon/pusch-Config.

Refer to Table 3. When the higher layer signaling pusch-ConfigCommon includes pusch-Allocationlist, time domain resource allocation is determined by using the field pusch-Allocationlist in the higher layer signaling pusch-Config-Common or pusch-Config.

used. When coverage is larger, a corresponding multipath delay spread is larger, and a required CP is larger. The extended CP may be used. For example, when a subcarrier spacing is 15 KHz, the normal CP is 144 Ts, and the extended CP

TABLE 3

| Radio network temporary identifier (radio network temporary identifier, RNTI) | PDCCH search space (PDCCH search space) | pusch-ConfigCommon includes pusch-AllocationList | pusch-Config includes pusch-AllocationList | PUSCH time domain resource allocation type to apply (PUSCH time domain resource allocation to apply) |
|---|---|---|---|---|
| A PUSCH is scheduled by using a MAC RAR (MAC random access request) as described in 8,2 of [6, TS 38.213] (PUSCH scheduled by MAC RAR as described in subclause 8.2 of [6, TS 38.213]) | | No Yes | — | Default A pusch-AllocationList provided in pusch ConfigCommon |
| Cell radio network temporary identifier (cell RNTI, C-RNTI) Temporary cell radio network temporary identity temporary Cell RNTI, TC-RNTI) | Any common search space associated with a control resource set 0 (Control resource set, CORESET) (Any common search space associated with CORESET 0) | No Yes | — | Default A pusch-Allocationtist provided in pusch-ConfigCommon |
| C-RNTI Radio network temporary identifier (radio network temporary identifier, RNTI) | Any common PDCCH search space (PDCCH search space) | No pusch-ContigCommon includes pusch-AllocationList | No pusch-Config includes pusch-AllocationList | Default A PUSCH time domain resource allocation type to apply (PUSCH time domain resource allocation to apply) |
| Configured scheduling radio network temporary identity (Configured Scheduling RNTI, CS-.RNTI) | search space not associated with the CORESET 0 user specific search space (Any common search space not associated with CORESET 0) user specific search space (UE specific search space) | Yes No/Yes | No Yes | pusch-AllocationList provided in pusch ConfigCOMmon pusch-AllocationList provided in pusch-Config |

Refer to Table 4 and Table 5. When the higher layer signaling pusch-ConfigCommon does not include pusch-Allocationlist, PUSCH time domain resource allocation of default A is used, and is a normal cyclic prefix (CP) and an extended CP of default A respectively. Table 4 shows the normal CP, and Table 5 shows the extended CP.

CP duration captured by the normal CP is shorter than that captured by the extended CP. When coverage is smaller, a corresponding multipath delay spread is smaller, and a required CP is smaller. Therefore, the normal CP may be

TABLE 4

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | i | 4 | 10 |
| 6 | Type B | j | 4 | 8 |
| 7 | Type B | j | 4 | 6 |

TABLE 4-continued

| Row index | PUSCH mapping type | $K_2$ | S | L |
|---|---|---|---|---|
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 5

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 0 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

Specific values of the PUSCH mapping type and related parameters (for example, the slot offset value K2, the start slot position S, the length L of the consecutive symbols, and the PUSCH mapping type) may be determined by notifying the row index by using the DCI. For example, when coverage is smaller, if the row index is 1, the PUSCH mapping type is Type A, the slot offset value K2 is j, the start slot position S is 0, and the length L of the consecutive symbols is 8. A value of j is related to a subcarrier spacing configuration $\mu_{PUSCH}$ of the PUSCH. Refer to Table 6. When $\mu_{PUSCH}$ is 0, the value of j is 1. When $\mu_{PUSCH}$ is 1, the value of j is 1.

TABLE 6

| $\mu_{PUSCH}$ | j |
|---|---|
| 0 | 1 |
| 1 | 1 |
| 2 | 2 |
| 3 | 3 |

When the PUSCH is scheduled by using the DCI, to send a CSI report rather than send a TB, the start slot position S and the consecutive symbols L of time domain resource allocation may still be determined by notifying the row index by using the DCI. However, the slot offset value K2 is determined based on reportSlotConfig in a higher-layer parameter CSI-ReportConfig.

For the start slot position at which the terminal device sends the PUSCH, $$S = n \cdot \left\lceil \frac{2^{\mu_{PUSCH}}}{2^{\mu_{PDCCH}}} \right\rceil + K_2,$$

where $\mu_{PUSCH}$ and $\mu_{PDCCH}$ respectively represent subcarrier spacing configurations of the PUSCH and the PDCCH.

The start slot position S, the consecutive symbols L, and time sequence time of a time domain symbol (Start and length indicator value, SLIV) satisfy: When L−1≤7, SLIV=14(L−1)+S. In addition, SLIV=14 (14−L+1)+(14−1−S).

5. Frequency Domain Resource Allocation Indicator:

Allocation types of frequency domain resources include discrete frequency domain resources, namely, a type 0, and consecutive frequency domain resources, namely, a type 1. The discrete frequency domain resources mean that available frequency domain resources are inconsecutive or incompletely consecutive, and the consecutive frequency domain resources mean that frequency domain resources are consecutive and are not separated by an unavailable frequency domain resource. The terminal device may determine an allocation type of the frequency domain resources based on the first downlink control information, or may determine the allocation type of the frequency domain resources based on higher layer signaling.

If a resource allocation type in pusch-Config is dynamic switch, the allocation type of the frequency domain resources may be determined by using the first downlink control information. If resource allocation in pusch-Config is another configuration other than dynamic switch, the allocation type of the frequency domain resources is determined by using the higher layer signaling.

It should be noted that, when a transform precoder is enabled (transform precoder enable), that is, when data transmission is performed by using a single-carrier frequency division multiple access (SC-FDMA) waveform, an allocation type of the frequency domain resources that is configured by the network device for the terminal device can only be the type 1.

When a transform precoder is disabled (transform precoder disabled), that is, when data transmission is performed by using a cyclic prefix frequency division multiple access (CP-OFDM) waveform, an allocation type of the frequency domain resources that is configured by the network device for the terminal device may be the type 0 or the type 1. When a DCI format is format 0_0, an allocation type of the frequency domain resources that is configured by the network device for the terminal device is the type 1.

When an allocation type of the frequency domain resources is the type 0, a resource block group (RBG) resource that should be scheduled by the terminal device is indicated by using a bitmap notified by using the DCI.

Specifically, each bit represents one resource block group (RBG), and a quantity of resource blocks (resource block, RB) included in each RBG depends on a bandwidth part and a configuration type (Configuration, Config for short). Both the BWP and the configuration type are configured by using higher layer signaling.

For example, refer to Table 7. When the BWP is between 1 and 36 and the field Config is 2, the RBG includes four RBs, namely, four physical resource blocks (physical resource block, PRB). When the BWP is between 37 and 72 and the field Config is 2, the RBG includes eight physical resource blocks (physical resource block, PRB).

TABLE 7

| PRB | Bandwidth Size (1-36) Config1 | Bandwidth Size (1-36) Config2 | Bandwidth Size (37-72) Config1 | Bandwidth Size (37-72) Config2 | Bandwidth Size (73-144) Config1 | Bandwidth Size (73-144) Config2 | Bandwidth Size (145-275) Config1 | Bandwidth Size (145-275) Config2 |
|---|---|---|---|---|---|---|---|---|
| 0 | RBG 00 | RBG 00 | RBG 00 | RBG 00 | RBG 00 | RBG 00 | RBG 00 | RBG 00 |
| 1 | | | | | | | | |
| 2 | RBG 01 | | | | | | | |
| 3 | | | | | | | | |
| 4 | RBG 02 | RBG 01 | RBG 01 | | | | | |
| 5 | | | | | | | | |
| 6 | RBG 03 | | | | | | | |
| 7 | | | | | | | | |
| 8 | RBG 04 | RBG 02 | RBG 02 | RBG 01 | RBG 01 | | | |
| 9 | | | | | | | | |
| 10 | RBG 05 | | | | | | | |
| 11 | | | | | | | | |
| 12 | RBG 06 | RBG 03 | RBG 03 | | | | | |
| 13 | | | | | | | | |
| 14 | RBG 07 | | | | | | | |
| 15 | | | | | | | | |

Table 7 may also be represented by using Table 8, and is specifically as follows. Table 8

TABLE 8

| Carrier Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In the bitmap, if a value of a bit at a corresponding position is 1, it indicates that a frequency domain resource associated with the position is available; otherwise, if a value of a bit at a corresponding position is 0, it indicates that a frequency domain resource associated with the position is unavailable.

When an allocation type of the frequency domain resources is the type 1, frequency domain resource allocation is configured by using two parameters: an RB start position and a length of consecutive RBs. Therefore, frequency domain resource allocation of the type 1 supports only consecutive PRB allocation.

6. Demodulation Reference Signal (DMRS) Antenna Port Indication:

The network device determines an antenna port based on a downlink DMRS configuration type (DL_dmrs_config_type) and a downlink front-loaded DMRS time domain length (DL_dmrs_config_maxlength), where DL_dmrs_config_type includes a first configuration type type-1 and a second configuration type type-2, and DL_dmrs_config_maxlength may include one time domain symbol and two symbols. Currently, the NR system may support spatial multiplexing of 12 antenna ports. However, in uplink transmission, a single terminal device may support transmission of a maximum of four layers of data.

Figure 4:
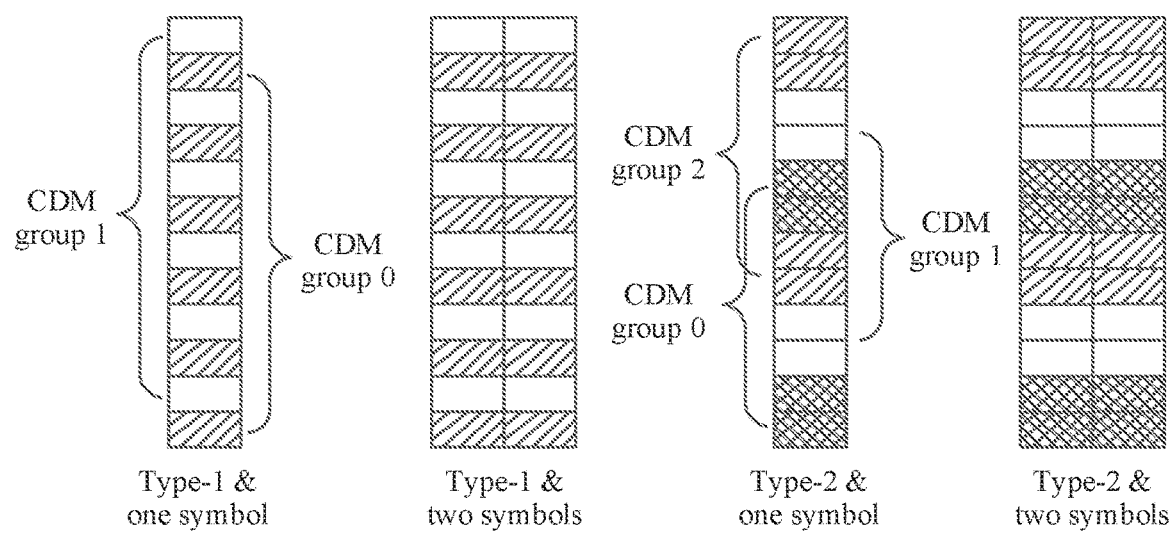
FIG. 4 is a schematic diagram of DMRS antenna port allocation according to an embodiment of this application.

FIG. 4 shows a correspondence status of DMRS antenna ports in different DL_dmrs_config_type and DL_dmrs_config_maxlength configurations. When the configuration type is type-1, a DMRS frequency domain may be divided into two groups: a code division multiplexing (CDM) group 0 and a CDM group 1. When the configuration type is type-2, a DMRS frequency domain may be divided into three groups: a CDM group 0, a CDM group 1, and a CDM group 2.

When the downlink DMRS configuration type is type-1 and the downlink front-loaded DMRS time domain length is one symbol, transmission of a maximum of four layers of data is supported, and transmission of four layers of data corresponds to four different antenna ports, where the CDM group 0 supports frequency domain orthogonal cover code (OCC) multiplexing of a port 0 and a port 1, and the CDM group 1 supports frequency domain OCC multiplexing of a port 2 and a port 3.

When the downlink DMRS configuration type is type-1 and the downlink front-loaded DMRS time domain length is two symbols, one symbol is added based on type-1 and the symbol above, to introduce a time domain OCC. Therefore, transmission of eight layers of data can be supported, and transmission of eight layers of data corresponds to eight different antenna ports, where the CDM group 0 supports frequency domain OCC multiplexing of a port 0 and a port 1 (a port 4 and a port 5), and the CDM group 1 supports frequency domain OCC multiplexing of a port 2 and a port 3 (a port 6 and a port 7).

When the downlink DMRS configuration type is type-2 and the downlink front-loaded DMRS time domain length is one symbol, transmission of a maximum of six layers of data is supported, and transmission of six layers of data corresponds to six different antenna ports, where the CDM group 0 supports frequency domain OCC multiplexing of a port 0 and a port 1, the CDM group 1 supports frequency domain OCC multiplexing of a port 2 and a port 3, and the CDM group 2 supports frequency domain OCC multiplexing of a port 4 and a port 5.

When the downlink DMRS configuration type is type-2 and the downlink front-loaded DMRS time domain length is two symbols, transmission of a maximum of 12 layers of data is supported, and transmission of 12 layers of data corresponds to 12 different antenna ports, where the CDM group 0 supports frequency domain OCC multiplexing of a port 0 and a port 1 (a port 6 and a port 7), the CDM group 1 supports frequency domain OCC multiplexing of a port 2 and a port 3 (a port 8 and a port 9), and the CDM group 2 supports frequency domain OCC multiplexing of a port 4 and a port 5 (a port 10 and a port 11).

For example, when a terminal device 1 and a terminal device 2 use a same PRB for data transmission, the terminal device 1 and the terminal device 2 may be in one CDM group (occupy a same subcarrier) and implement interference cancellation by using an orthogonal code. For example, the terminal device 1 (a layer 2) uses a port 0 and a port 1, and the terminal device 2 (a layer 1) uses a port 4.

When a terminal device 1 and a terminal device 2 use different PRBs for data transmission, the terminal device 1 and the terminal device 2 cannot be in a same CDM group (different subcarriers need to be occupied, and interference cancellation is implemented through FDM). In this case, the terminal device 1 (a layer 2) may use a port 0 and a port 1, and the terminal device 2 (a layer 1) may use a port 2.

Refer to Table 9. An index value needs to be notified by using DCI, to select, from predefined Table 9, a number of an antenna port used by each terminal device. For example, when dmrs_config_type=1, dmrs_config_maxlength=1, and a transform precoder is disabled, the DCI indicates and notifies, by using 2 bits, an antenna port that should be used by the terminal device. When a bit value is 00, a corresponding value is 0, and an antenna port that should be used by the terminal device is a port 0. When a bit value is 01, a corresponding value is 1, and an antenna port that should be used by the terminal device is a port 1. When a bit value is 10, a corresponding value is 2, and an antenna port that should be used by the terminal device is a port 2. When a bit value is 11, a corresponding value is 3, and an antenna port that should be used by the terminal device is a port 3.

TABLE 9

| Value | Quantity of DMRS CDM groups without data Number of DMRS CDM group(s) without data | DMRS port(s) |
|---|---|---|
| 0 | 2 | 0 |
| 1 | 2 | 1 |
| 2 | 2 | 2 |
| 3 | 2 | 3 |

7. Modulation and Coding Scheme (MCS) Indicator:

The network device determines uplink channel fading based on an uplink sounding reference signal (SRS), and selects a corresponding modulation order and a target code rate. Scheduling information of uplink transmission is sent to the terminal device by using DCI.

When channel quality is better, the network device selects a higher modulation order and target code rate, to increase a data rate of uplink transmission. When channel quality is poorer, the network device selects a lower modulation order and target code rate, to resist channel fading by adding redundant bits, and ensure correct transmission of a TB.

Refer to Table 10. 32 different MCS combinations are provided in a form of a predefined table in an existing NR protocol. A corresponding index value is sent to the terminal device by using a 5-bit indication in DCI. The terminal device may determine, based on the index value, a modulation order and a target bit rate that should be used.

For example, when an index value of a modulation and coding scheme is 3, the used modulation order is 2, and a product of the target code rate and 1024 is 251.

TABLE 10

| Index value | Modulation order | Target code rate*1024 | Spectrum efficiency |
|---|---|---|---|
| 0 | q | 240/q | 0.2344 |
| 1 | q | 314/q | 0.3066 |
| 2 | 2 | 193 | 0.377 |
| 3 | 2 | 251 | 0.4902 |
| 4 | 2 | 308 | 0.6016 |
| 5 | 2 | 379 | 0.7402 |
| 6 | 2 | 449 | 0.877 |

TABLE 10-continued

| Index value | Modulation order | Target code rate*1024 | Spectrum efficiency |
|---|---|---|---|
| 7 | 2 | 526 | 1.0273 |
| 8 | 2 | 602 | 1.1758 |
| 9 | 2 | 679 | 1.262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.332 |
| 27 | 6 | 948 | 5.5547 |
| 28 | q | | reserved |
| 29 | 2 | | reserved |
| 30 | 4 | | reserved |
| 31 | 6 | | reserved |

8. New Data Indicator (NDI) Indicator:

Each terminal device determines, by using a 1-bit NDI indicator, whether data is newly transmitted or retransmitted. The terminal device determines whether the data is retransmitted in an uplink in the following two manners.

Manner 1: Triggering of an acknowledgement (ACK) response or a negative acknowledgement (NACK) response transmitted on a physical hybrid automatic repeat request indicator channel (physical hybrid ARQ indicator channel, PHICH). After receiving the PUSCH, the network device performs decoding. If decoding is correct, an ACK is sent by using the PHICH, to indicate that the terminal device does not need to perform data retransmission. If decoding fails, a NACK is sent by using the PHICH, to indicate that the terminal device needs to perform data retransmission.

Manner 2: That the terminal device may send the data is indicated through triggering of an uplink scheduling grant (UL grant) transmitted on the PDCCH. Whether the data is newly transmitted or retransmitted is determined depending on whether the NDI is reversed. NDI inversion means that a value of the NDI changes from 0 to 1 or from 1 to 0. If an NDI parameter is reversed compared with a previous NDI parameter, it indicates new transmission. If an NDI parameter is the same as a previous NDI parameter, it indicates retransmission. The PHICH is usually used to indicate non-adaptive retransmission, and has a lower priority than the NDI indicator in DCI. A resource conflict of a user can be adaptively resolved by retransmission through inversion of the NDI in the DCI on the PDCCH.

9. Redundancy Version (RV) Number Indicator:

2 bits are required to indicate an RV number of each terminal device, and a value may be {0, 1, 2, 3}. During current data channel transmission, channel coding is performed by using a low density parity check (LDPC) code, so that a capability of resisting channel fading can be enhanced.

Rate matching is performed, based on the MCS indicator, on a bit sequence encoded through LDPC, that is, bits are selected at different positions and from the bit sequence encoded through LDPC, to satisfy a corresponding code rate. Some bits selected from the bit sequence encoded through LDPC are referred to as an RV.

In an existing NR system, there are four selection start points for the bit sequence encoded through LDPC. Selected RVs may be respectively defined as an RV 0, an RV 1, an RV 2, and an RV 3. A number of an RV used by the terminal device for each time of transmission needs to be indicated. During HARQ retransmission, combined decoding is performed on RVs received for a plurality of times.

10. Hybrid Automatic Repeat Request (Hybrid Automatic Repeat reQuest, HARQ) Process Indicator:

4 bits are required to indicate a HARQ process of each terminal device. Because a waiting time of the terminal device between sending data and receiving data is relatively long, to avoid a waste of a time domain resource in the waiting time, a time domain symbol corresponding to the waiting time may be used to send data of another process. Therefore, the current NR system can support transmission of a maximum of 16 processes.

In the embodiments of this application, the network device 10 may be a transmission reception point (TRP), a base station, a relay station, an access point, or the like. The network device 10 may be a network device in a 5G communication system or a network device in a future evolved network, or may be a wearable device, a vehicle-mounted device, or the like. In addition, the network device 10 may alternatively be a base transceiver station (BTS) in a global system for mobile communications (GSM) or a code division multiple access (CDMA) network, may be an NB (NodeB) in wideband code division multiple access (WCDMA), or may be an eNB or eNodeB (evolved NodeB) in long term evolution (LTE). The network device 10 may alternatively be a radio controller in a cloud radio access network (CRAN) scenario.

In the embodiments of this application, the terminal device 20 is a device having a wireless communication function, and may be deployed on land, including an indoor or outdoor device, a handheld device, or a vehicle-mounted device; may be deployed on water (for example, on a ship); or may be deployed in the air (for example, on an airplane, a balloon, and a satellite). The terminal device, also referred to as user equipment (UE), a mobile station (MS), a mobile terminal (MT), a terminal device, and the like, is a device that provides voice and/or data connectivity for a user. For example, the terminal device includes a handheld device or a vehicle-mounted device that has a wireless connection function. Currently, the terminal device may be a mobile phone, a tablet computer, a notebook computer, a palmtop computer, a mobile internet device (MID), a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, a wireless terminal device in industrial control, a smart home device (for example, a refrigerator, a television, an air conditioner, or an electricity meter), an intelligent robot, a workshop device, a wireless terminal device in self driving, a wireless terminal device in remote medical surgery, a wireless terminal device in a smart grid, a wireless terminal device in transportation safety, a wireless terminal device in a smart city, a wireless terminal device in a smart home, a flight device (for example, an intelligent robot, a hot balloon, an unmanned aerial vehicle, or an aircraft), or the like. In a possible application scenario of this application, the terminal device is a terminal device that often operates on land, for example, a vehicle-mounted device. In this application, for ease of description, a chip deployed in the foregoing device, for example, a system-on-a-chip (SOC), a baseband chip, or another chip having a communication function, may also be referred to as a terminal device.

The terminal device may be a vehicle having a corresponding communication function, a vehicle-mounted communication apparatus, or another embedded communication apparatus, or may be a handheld communication device of a user, including a mobile phone, a tablet computer, or the like.

In an example, in the embodiments of this application, the terminal device may be alternatively a wearable device. The wearable device may also be referred to as a wearable intelligent device, and is a generic name of wearable devices developed by intelligently designing daily wear by using a wearable technology, for example, glasses, gloves, a watch, clothing, and shoes. The wearable device is a portable device that can be directly worn by a user or integrated into clothes or an accessory of the user. The wearable device is not only a hardware device, but also implements powerful functions through software support, data exchange, and cloud interaction. Generalized wearable intelligent devices include full-featured and large-size devices that can implement complete or partial functions without depending on smartphones, for example, smart watches or smart glasses, and devices that focus only on one type of application function and need to work with other devices such as smartphones, for example, various smart bands or smart jewelry for monitoring physical signs.

The network device is an entity that is used in combination with the terminal device and that may be configured to transmit or receive a signal. For example, the network device may be an access point (AP) in a WLAN, or may be an eNB or an eNodeB in LTE, a relay station or an access point, a vehicle-mounted device, a wearable device, a network device in a future 5G network, or a network device in a future evolved public land mobile network (PLMN) network.

In addition, in the embodiments of the present disclosure, the network device provides a service for a cell, and the terminal device communicates with the network device by using a transmission resource (for example, a time domain resource, a frequency domain resource, or a time-frequency resource) used in the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by small coverage and low transmit power, and are applicable to providing a high-rate data transmission service.

In indication of the DCI in format 0_1, a plurality of fields are defined to indicate a plurality of parameters, for example, a time-frequency resource, a modulation and coding scheme, and an antenna port, that should be used by each terminal device for PUSCH transmission. Each piece of DCI needs to occupy a plurality of bits to indicate data transmission of the terminal device. Even in the MU-MIMO system, DCI of each terminal device is separately configured.

Figure 5:
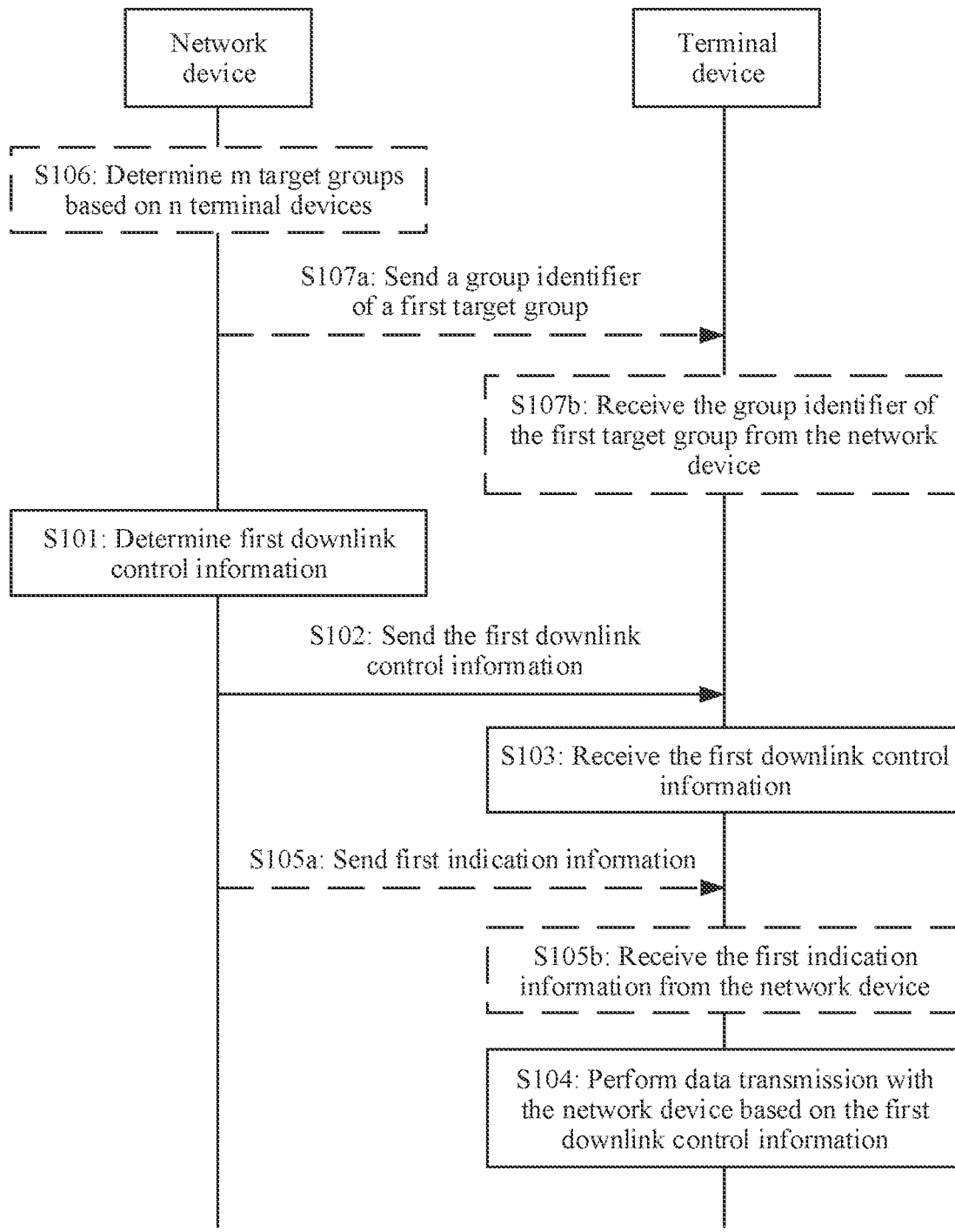
FIG. 5 is a schematic flowchart of a data transmission method according to an embodiment of this application.

FIG. 5 is a schematic flowchart of a data transmission method according to an embodiment of this application. The method includes the following steps.

S101: A network device determines first downlink control information.

The first downlink control information includes any one or more of DMRS antenna port indication information, frequency domain resource indication information, time domain resource indication information, a hybrid automatic repeat request (Hybrid Automatic Repeat reQuest, HARQ)

process indicator, a new data indicator (NDI) indicator, and a redundancy version (RV) indicator. Different indication information separately occupies different bits in the first downlink control information.

When a terminal device needs to receive a PDSCH and/or schedule the PUSCH, the network device performs S101. For example, the network device determines a quantity of paired terminal devices, a total quantity of layers of data on which parallel transmission is performed, and the first downlink control information based on CSI reported by each terminal device in a cell, interference calculation of a plurality of terminal devices, interference calculation of a plurality of cells, a current service type and characteristic, and the like.

S102: The network device sends the first downlink control information to n terminal devices, where the first downlink control information indicates the n terminal devices to perform data transmission, and n is an integer greater than or equal to 2.

For example, the n terminal devices are paired terminal devices, and the n terminal devices occupy a same time domain resource when performing data transmission. Therefore, the n terminal devices may share one piece of downlink control information. The first downlink control information is common information of the n terminal devices, namely, information that may be shared by the n terminal devices.

When frequency domain resources used by the n terminal devices to perform data transmission completely overlap, the network device sends the same first downlink control information to each of the n terminal devices.

For example, the network device may send a PDCCH to each of the n terminal devices, where the PDCCH carries the first downlink control information.

S103: The terminal device receives the first downlink control information from the network device.

S104: The terminal device performs data transmission with the network device based on the first downlink control information.

The terminal device may determine information such as a DMRS antenna port, a frequency domain resource, and a time domain resource based on the first downlink control information, and perform data transmission with the network device based on the information. The data transmission between the terminal device and the network device includes: The terminal device receives downlink data from the network device, and/or the terminal device sends uplink data to the network device.

This embodiment of this application provides the data transmission method. The network device sends the first downlink control information to the n terminal devices to indicate data transmission of the n terminal devices. Compared with a conventional technology in which downlink control information is separately sent to each terminal device for indication, this embodiment can reduce total bit overheads of sending downlink control information and improve system performance.

In a possible implementation, when the frequency domain resources used by the n terminal devices to perform data transmission completely overlap or incompletely overlap, the first downlink control information includes the DMRS antenna port indication information. The DMRS antenna port indication information indicates a first sequence value corresponding to the n terminal devices. The first sequence value is used to determine DMRS antenna port combinations corresponding to the n terminal devices.

The first sequence value is indication information including a correspondence between the n terminal devices and the DMRS antenna port combinations. For example, the first sequence value may be index values of the DMRS antenna port combinations corresponding to the n terminal devices.

For example, the terminal device may determine, in a first correspondence table based on the first sequence value, the DMRS antenna port combinations corresponding to the n terminal devices.

For example, the terminal device may determine the first correspondence table in a predefined manner, or may obtain the first correspondence table from the network device.

In a possible implementation, the first correspondence table is determined in the following two manners.

Manner 1: The network device sends first information to the n terminal devices, and the terminal devices receive the first information from the network device, to determine the first correspondence table, where the first information includes the first correspondence table.

For example, the network device may send higher layer signaling to the terminal device, where the higher layer signaling carries the first information. For example, the higher layer signaling may be radio resource control (RRC) signaling. Time for configuring or updating the higher layer signaling is usually tens to hundreds of milliseconds. In a multi-user MIMO system with a low moving rate, a quasi-static channel remains unchanged in a period of time. Therefore, the first correspondence table may be configured by using the higher layer signaling.

Manner 2: The network device sends second information to the n terminal devices, where the second information may be configured by using RRC signaling and sent to the n terminal devices. The second information may include a value of n and a total quantity of layers of data on which the n terminal devices perform parallel transmission, and may further include configuration information of a plurality of parameters such as dmrs_config_type, DL_dmrs_config_maxlength, and a transform precoder. Different quantities of terminal devices and total quantities of layers of data on which parallel transmission is performed may correspond to different first correspondence tables. The second information is used by the n terminal devices to determine the first correspondence table based on a predefined first relationship table set. The first relationship table set includes at least one first correspondence table. The first correspondence table includes a correspondence between at least one first sequence value, at least one second sequence value, and a DMRS antenna port.

The first relationship table set includes a plurality of first correspondence tables. Because the different quantities of terminal devices and total quantities of layers of data on which parallel transmission is performed correspond to the different first correspondence tables, the terminal device may determine the first correspondence table in the predefined first relationship table set based on the second information.

It should be noted that both the network device and the terminal device store the predefined first relationship table set.

For example, the first sequence value is the index values of the DMRS antenna port combinations corresponding to the n terminal devices. Refer to Table 11. When the value of n is 3, and a total quantity of layers of data on which the three terminal devices perform parallel transmission is 8, Table 11 is a possible representation form of the first correspondence table. An antenna port correspondence when first sequence values are 0 to 11 indicates that quantities of layers of data on which the three terminal devices perform parallel transmission are respectively 2, 2, and 4. An antenna port correspondence when first sequence values are 12 to 15 indicates that quantities of layers of data on which the three terminal devices perform parallel transmission are respectively 1, 3, and 4.

The DMRS antenna port combinations corresponding to the n terminal devices may be determined by using the first correspondence table and the first sequence value. For example, if the first sequence value is 0, the three terminal devices respectively correspond to antenna port combinations: (port 0, port 1), (port 4, port 5), and (port 2, port 3, port 6, port 7).

TABLE 11

| First sequence value | Second sequence value | | | Layers |
|---|---|---|---|---|
| | 1 | 2 | 3 | |
| 0 | 0 and 1 | 4 and 5 | 2, 3, 6, and 7 | 8 layers = 4 + 2 + 2 |
| 1 | 4 and 5 | 0 and 1 | 2, 3, 6, and 7 | |
| 2 | 0 and 4 | 1 and 5 | 2, 3, 6, and 7 | |
| 3 | 0 and 5 | 1 and 4 | 2, 3, 6, and 7 | |
| 4 | 1 and 5 | 0 and 4 | 2, 3, 6, and 7 | |
| 5 | 1 and 4 | 0 and 5 | 2, 3, 6, and 7 | |
| 6 | 2 and 3 | 6 and 7 | 0, 1, 4, and 5 | |
| 7 | 6 and 7 | 2 and 3 | 0, 1, 4, and 5 | |
| 8 | 2 and 6 | 3 and 7 | 0, 1, 4, and 5 | |
| 9 | 2 and 7 | 3 and 6 | 0, 1, 4, and 5 | |
| 10 | 3 and 7 | 2 and 6 | 0, 1, 4, and 5 | |
| 11 | 3 and 6 | 2 and 7 | 0, 1, 4, and 5 | |
| 12 | 5 | 0, 1, and 4 | 2, 3, 6, and 7 | 8 layers = 4 + 3 + 1 |
| 13 | 4 | 0, 1, and 5 | 2, 3, 6, and 7 | |
| 14 | 7 | 2, 3, and 6 | 0, 1, 4, and 5 | |
| 15 | 6 | 2, 3, and 7 | 0, 1, 4, and 5 | |
| | None | | | 8 layers = 3 + 3 + 2 |

The first correspondence table includes the correspondence between the at least one first sequence value, the at least one second sequence value, and the DMRS antenna port. Therefore, in a possible embodiment, as shown in FIG. 5, the method provided in this embodiment of this application further includes the following steps before S104.

S105a: The network device sends first indication information to the n terminal devices.

For example, in this embodiment of this application, the network device may separately send the first indication information to each of the n terminal devices by using second downlink control information. The first indication information is carried in the second downlink control information, and the second downlink control information is sent for each terminal device and is used to carry the first indication information. Alternatively, the network device may separately send the first indication information to each of the n terminal devices by using higher layer signaling. The first indication information indicates a second sequence value corresponding to each of the n terminal devices. Second sequence values may be index values indicating a pairing sequence of the n terminal devices.

S105b: The terminal device receives the first indication information from the network device.

Still refer to Table 11. Based on the foregoing example, the terminal device may determine, with reference to the first sequence values and the second sequence values, an antenna port corresponding to each of the three terminal devices.

For example, when the second sequence value is an index value, if the second sequence value is 3, antenna ports corresponding to the terminal device are an antenna port 2, an antenna port 3, an antenna port 6, and an antenna port 7. Therefore, the antenna port corresponding to each of the three terminal devices may be determined by using the second sequence values.

In a possible implementation, when the frequency domain resources used by the n terminal devices to perform data transmission incompletely overlap, in a possible embodiment, as shown in FIG. 5, the method provided in this embodiment of this application further includes the following steps before S101.

S106: The network device determines m target groups based on the n terminal devices.

The n terminal devices include the m target groups, where m is an integer greater than or equal to 2. Frequency domain resources used by a terminal device in a same target group in the m target groups to perform data transmission are the same. Frequency domain resources used by terminal devices in different target groups in the m target groups to perform data transmission are incompletely the same. In other words, the frequency domain resources used by the terminal devices in the different target groups to perform data transmission may be completely different, or may be partially the same.

In a possible implementation, S102 in this embodiment of this application may alternatively be implemented in the following manner: The first downlink control information may include m pieces of third downlink control information, and the network device sends, to each of the m target groups, third downlink control information corresponding to the target group, where third downlink control information corresponding to any target group indicates a terminal device in any target group to perform data transmission.

For example, third downlink control information 1 indicates a terminal device in a target group 1 to perform data transmission, and third downlink control information 2 indicates a terminal device in a target group 2 to perform data transmission, where the third downlink control information 1 is different from the third downlink control information 2.

The terminal device in the m target groups may determine, based on a first sequence value in corresponding third downlink control information, a DMRS antenna port combination corresponding to a corresponding target group in the first correspondence table obtained in Manner 1 or Manner 2.

For example, the target group 1 corresponds to the third downlink control information 1, the third downlink control information 1 includes a first sequence value, and the terminal device in the target group 1 may determine, in the first correspondence table based on the first sequence value, DMRS antenna port combinations used by all terminal devices in the target group 1.

S105 in this embodiment of this application may alternatively be implemented in the following manner: The network device separately sends first indication information to each terminal device in each of the m target groups by using higher layer signaling or second downlink control information. The first indication information indicates a second sequence value corresponding to each terminal device in each of the m target groups. Each terminal device may determine a corresponding DMRS antenna port based on the first sequence value and the second sequence value. For a method for determining the DMRS antenna port by the terminal device, refer to S105. Details are not described herein again.

In a possible embodiment, as shown in FIG. 5, the method provided in this embodiment of this application further includes the following steps after S106.

S107a: The network device sends a group identifier of a first target group to a terminal device in the first target group.

For example, the group identifier of the first target group in this embodiment of this application may be carried in the first downlink control information. Alternatively, the network device may send the group identifier of the first target group to the terminal device in the first target group by using higher layer signaling.

In a possible implementation, refer to Table 12. The first correspondence table further includes a correspondence between at least one group identifier and the DMRS antenna port.

TABLE 12

| First sequence value | Group identifier | | | Layers |
|---|---|---|---|---|
| | Group identifier 1 | | Group identifier 2 | |
| | Second sequence value | | | |
| | 1 | 2 | 1 | |
| 0 | 0 and 1 | 4 and 5 | 2, 3, 6, and 7 | 8 layers = 4 + 2 + 2 |
| 1 | 0 and 4 | 1 and 5 | 2, 3, 6, and 7 | |
| 2 | 0 and 5 | 14 | 2, 3, 6, and 7 | |
| 3 | 1 and 4 | 0 and 5 | 2, 3, 6, and 7 | |
| 4 | 2 and 3 | 6 and 7 | 0, 1, 4, and 5 | |
| 5 | 2 and 6 | 3 and 7 | 0, 1, 4, and 5 | |
| 6 | 2 and 7 | 3 and 6 | 0, 1, 4, and 5 | |
| 7 | 3 and 7 | 2 and 6 | 0, 1, 4, and 5 | |
| 8 | 0 | 1, 4, and 5 | 2, 3, 6, and 7 | 8 layers = 4 + 3 + 1 |
| 9 | 1 | 0, 4, and 5 | 2, 3, 6, and 7 | |
| 10 | 2 | 3, 6, and 7 | 0, 1, 4, and 5 | |
| 11 | 3 | 2, 6, and 7 | 0, 1, 4, and 5 | |
| 12 | 4 | 0, 1, and 5 | 2, 3, 6, and 7 | |
| 13 | 5 | 0, 1, and 4 | 2, 3, 6, and 7 | |
| 14 | 6 | 2, 3, and 7 | 0, 1, 4, and 5 | |
| 15 | 7 | 2, 3, and 6 | 0, 1, 4, and 5 | |
| | | None | | 8 layers = 3 + 3 + 2 |

The group identifier is used to enable the terminal device that belongs to the first target group to determine that the terminal device belongs to the first target group, and the first target group is any one of the m target groups S107b: The terminal device receives the group identifier of the first target group from the network device.

For example, a terminal device 1 may determine, based on the group identifier, that the first target group includes the terminal device 1 and a terminal device 2, and then determine, by using a second sequence value, an index value indicating a pairing sequence of the terminal device 1, to determine a DMRS antenna port corresponding to the terminal device 1.

In a possible embodiment, the first downlink control information in this embodiment of this application may further include second indication information, and the second indication information indicates the frequency domain resources used when the n terminal devices perform data transmission.

When frequency domain resources of the n terminal devices completely overlap, that is, when the frequency domain resources used by the n terminal devices to perform data transmission are the same, the network device sends the second indication information to the n terminal devices, and the n terminal devices may determine the frequency domain resources based on the second indication information.

When frequency domain resources of the n terminal devices incompletely overlap, that is, the frequency domain resources used by the n terminal devices to perform data transmission are different (do not overlap) or are incompletely the same (may partially overlap). For example, frequency domain resources used by at least two of the n terminal devices to perform data transmission may be completely the same, and frequency domain resources used by other terminal devices to perform data transmission are incompletely the same. Alternatively, the frequency domain resources used by all the n terminal devices to perform data transmission may be incompletely the same. The network device determines the m target groups based on the n terminal devices. For specific implementation, refer to S106. Details are not described herein again. The network device separately sends the second indication information to each of the m target groups, and each target group determines a frequency domain resource of the corresponding target group based on the corresponding second indication information.

For example, the network device sends second indication information 1 to a target group 1, and sends second indication information 2 to a target group 2. The second indication information 1 is carried in first downlink control information 1, and the second indication information 2 is carried in first downlink control information 2. The target group 1 may determine a frequency domain resource of the target group 1 based on the second indication information 1, and the target group 2 may determine a frequency domain resource of the target group 2 based on the second indication information 2.

Specific meanings of the second indication information vary with different allocation types of frequency domain resources. Therefore, the following separately describes the meanings.

Example 1: When an allocation type of the frequency domain resources is a type 0, a quantity of RBGs is determined based on a bandwidth part and a configuration type, and an available RBG is determined by using the second indication information. The second indication information includes at least one first bit and at least one second bit. The first bit indicates that a frequency domain resource associated with the first bit is available, and the second bit indicates that a frequency domain resource associated with the second bit is unavailable. The n terminal devices determine a configured RBG resource based on the second indication information.

For example, the second bit may be "0", and the first bit may be "1".

For example, the network device determines that the quantity of RBGs is 8, and a frequency domain resource that should be used by the terminal device is indicated by using a bitmap of an 8-bit length in DCI. The bitmap may be 10001101, indicating that frequency domain resources associated with positions of the first RBG, the fifth RBG, the sixth RBG, and the eighth RBG (bit values of the corresponding positions are 1) are available, and the remaining four RBGs (bit values of corresponding positions are 0) are unavailable. The n terminal devices may determine the configured RBG resource based on an indication of the bitmap.

Example 2: When an allocation type of the frequency domain resources is a type 1, the second indication information includes a resource indication value, the resource indication value is used to determine frequency domain resource start points and lengths of consecutive resource blocks in the frequency domain resources of the n terminal devices, where the frequency domain resource start points of the terminal devices may be the same, or may be incompletely the same. That the frequency domain resource start points are incompletely the same may be that frequency domain resource start points of some terminal devices are the same and frequency domain resource start points of others are different. Correspondingly, the lengths of the consecutive resource blocks in the frequency domain resources of the n terminal devices may alternatively be the same or incompletely the same. Details are not described herein again.

The second indication information may be a resource indication value (RIV) field in the first downlink control information. A quantity of bits of the resource indication value is $$\left\lceil \log_2\left(\frac{n_1 * (n_1 + 1)}{2}\right)\right\rceil,$$

where $n_1$ represents a bandwidth length of a current bandwidth part, and is a known value preconfigured by the network device. The terminal device may determine the RIV based on the quantity of bits. For example, when a value of 4 bits is 1111, a value of the RIV is 16; or when a value of 4 bits is 0000, a value of the RIV is 1. The terminal device may determine a corresponding frequency domain resource start point $RB_{start}$ and a length $L_{RB}$ of consecutive resource blocks in the frequency domain resources based on the RIV.

Specifically, the terminal device may determine $RB_{start}$ and $L_{RB}$ by using $$\frac{RIV}{n_1},$$

where a remainder of $$\frac{RIV}{n_1}$$

is $RB_{start}$, and a quotient is $L_{RB}-1$. For example, when the RIV is 16, and $n_1$ is 4, $RB_{start}$ is 0, and $L_{RB}$ is 5.

After determining $RB_{start}$ and $L_{RB}$, the terminal device further needs to verify $RB_{start}$ and $L_{RB}$.

If the length $L_{RB}$ of the resource blocks and $n_1$ satisfy $$L_{RB} - 1 \leq \frac{n_1}{2},$$

$RIV = n_1 * (L_{RB}-1) + RB_{start}$.

If $L_{RB}$ and $n_1$ satisfy $$L_{RB} - 1 > \frac{n_1}{2},$$

and $(n_1 - RB_{start}) \geq L_R \geq 1$, $RIV = n_1 * (n_1 - L_{RB} +) + (n_1 - 1 - RB_{start})$.

When there are three paired terminal devices, each terminal device needs a 10-bit bitmap in a conventional technology to indicate a position of an RBG that should be scheduled, and a total of 30 bits are required for three paired users. In this embodiment of this application, the first DCI uniformly indicates positions of RBGs that should be scheduled by the three paired terminal devices, and only 10 bits are required. Therefore, compared with the conventional technology, this embodiment of this application can reduce DCI frequency domain resource indication overheads by 67%.

In a possible embodiment, the first downlink control information in this embodiment of this application further includes third indication information, and the third indication information indicates time domain resources used when the n terminal devices perform data transmission.

Because the n paired terminal devices occupy completely overlapped time domain resources, when the network device performs data transmission with the terminal devices, the network device only needs to send one piece of common DCI to the n terminal devices to indicate a time domain configuration.

For example, when there are three paired terminal devices, 4 bits are required to indicate a value of m (16 possible values). If the value is indicated separately, 12 bits are required for overheads of time domain resource indication of DCI for the three terminal devices. However, the first DCI in this embodiment of this application uniformly indicates the three paired terminal devices, and only 4 bits are required for indication. In comparison, the overheads of time domain resource indication of the DCI can be reduced by 67%.

In a possible embodiment, the first downlink control information in this embodiment of this application further includes fourth indication information, and the fourth indication information indicates HARQ process indicators used when the n terminal devices perform data transmission.

Because a current NR system can support transmission of a maximum of 16 processes, a larger quantity of paired terminal devices indicates a larger quantity of total processes. A maximum quantity of processes supported by each terminal device may be determined based on a quantity of paired terminal devices, namely, the value of n. The value of n is included in the fourth indication information.

For example, refer to Table 13. A larger quantity of paired users indicates smaller DCI overheads. When there are three paired terminal devices, a single terminal device supports a maximum of eight processes, and each terminal device requires 3 bits for indication. Therefore, indication overheads of total HARQ processes in the first downlink control information are 9 bits. Compared with the conventional technology in which each terminal device requires 4 bits for indication and three terminal devices require 12 bits, this embodiment of this application can reduce the indication overheads of the HARQ processes in the DCI by 25%.

TABLE 13

| Quantity of paired users | Maximum quantity of processes supported by a single terminal device | Bit of process indication of the single terminal device |
| --- | --- | --- |
| ≥8 | 2 processes | 1-bit indication |
| [4, 8) | 4 processes | 2-bit indication |
| [2, 4) | 8 processes | 3-bit indication |
| 1 | 16 processes | 4-bit indication |

In a possible embodiment, the first downlink control information in this embodiment of this application further includes fifth indication information, and the fifth indication information indicates NDI indicators used when the n terminal devices perform data transmission.

A single terminal device needs one bit to indicate whether an NDI is reversed. In multi-user pairing, a K-bit bitmap may be defined in the first downlink control information based on the quantity n of paired UE to uniformly indicate values of the NDIs of the n users.

In a possible embodiment, the first downlink control information in this embodiment of this application further includes sixth indication information, and the sixth indication information indicates an RV indicator used when the n terminal devices perform data transmission.

2 bits are required to indicate an RV number of a single terminal device. In multi-user pairing, an n*2-bit sequence may be defined in the first downlink control information based on the quantity n of paired terminal devices to indicate RV numbers of the n terminal devices.

It should be noted that all other fields, for example, a DCI format indicator, a subcarrier indicator, and a bandwidth part indicator, in the first downlink control information may use a method for indicating the single terminal device by using the DCI. The n paired terminal devices are uniformly indicated by using the first downlink control information, and DCI does not need to be separately configured for each terminal device. Therefore, a larger quantity of paired terminal devices indicates larger total DCI overheads that are reduced.

The foregoing describes the solutions in the embodiments of this application mainly from a perspective of interaction between devices. It may be understood that, to implement the foregoing functions, the devices such as the network device and the terminal device include a corresponding hardware structure and/or software module for performing each of the functions. A person skilled in the art should be easily aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal device may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that in the embodiments of this application, division into units is an example, and is merely logical function division. During actual implementation, there may be another division manner.

The foregoing describes the method in the embodiments of this application with reference to FIG. 1 to FIG. 5. The following describes data transmission apparatuses that are provided in the embodiments of this application and that perform the foregoing method. A person skilled in the art may understand that the method and the apparatus may be combined with and referenced to each other, and the data transmission apparatus provided in the embodiments of this application may perform steps performed by the network device and the terminal device in the foregoing data transmission method.

Descriptions are provided below by using an example in which function modules are obtained through division based on corresponding functions.

Figure 6:
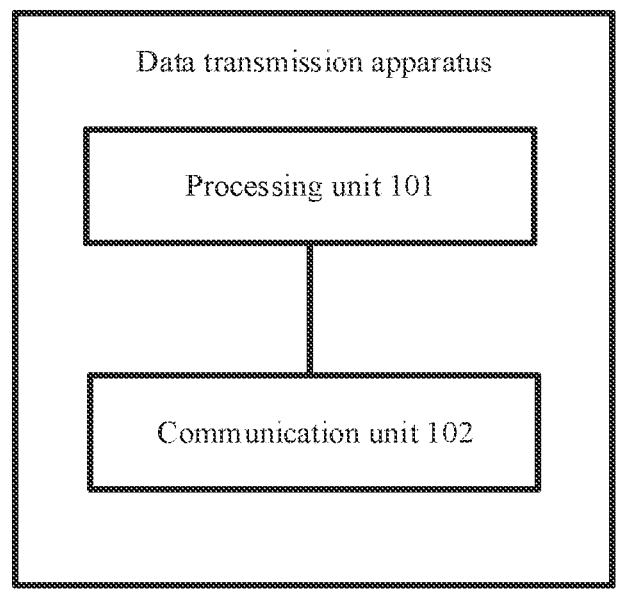
FIG. 6 is a schematic diagram of a structure of a data transmission apparatus according to an embodiment of this application.

When an integrated unit is used, FIG. 6 shows a data transmission apparatus in the foregoing embodiments. The data transmission apparatus may include a processing unit 101 and a communication unit 102.

In an example, the data transmission apparatus is a network device, or is a chip used in the network device. In this case, the communication unit 102 is configured to support the data transmission apparatus in performing S102 performed by the network device in the foregoing embodiments. The processing unit 101 is configured to support the data transmission apparatus in performing S101 performed by the network device in the foregoing embodiments.

In a possible embodiment, the communication unit 102 is further configured to support the data transmission apparatus in performing S105a and S107a performed by the network device in the foregoing embodiments, and is further configured to support the data transmission apparatus in performing S106 performed by the network device in the foregoing embodiments.

In another example, the data transmission apparatus is a terminal device, or is a chip used in the terminal device. In this case, the processing unit 101 is configured to support the data transmission apparatus in performing S104 performed by the terminal device in the foregoing embodiments. The communication unit 102 is configured to support the data transmission apparatus in performing S103 performed by the terminal device in the foregoing embodiments.

In a possible embodiment, the communication unit 102 is further configured to support the data transmission apparatus in performing S105b and S107b performed by the terminal device in the foregoing embodiments.

The data transmission apparatus may further include a storage unit. The storage unit is configured to store computer program code, where the computer program code includes instructions. If the data transmission apparatus is used in the network device, the storage unit may be a storage unit (for example, a register or a cache) in the chip, or may be a storage unit (for example, a read-only memory or a random access memory) outside the chip and in the network device.

Figure 7:
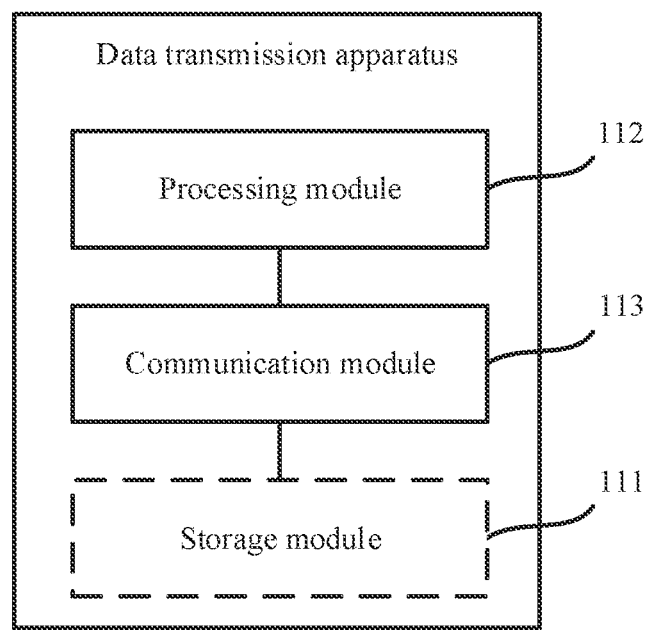
FIG. 7 is a schematic diagram of a structure of another data transmission apparatus according to an embodiment of this application.

When an integrated unit is used, FIG. 7 is a schematic diagram of a possible logical structure of a data transmission apparatus in the foregoing embodiments. The data transmission apparatus includes a processing module 112 and a communication module 113. The processing module 112 is configured to control and manage actions of the data transmission apparatus. For example, the processing module 112 is configured to perform a step of performing information/data processing in the data transmission apparatus. The communication module 113 is configured to support an information/data sending or receiving step in the data transmission apparatus.

In a possible embodiment, the data transmission apparatus may further include a storage module 111, configured to store program code and data of the data transmission apparatus.

For example, the data transmission apparatus is a network device, or is a chip used in the network device. In this case, the communication module 113 is configured to support the data transmission apparatus in performing S102 performed by the network device in the foregoing embodiments. The processing module 112 is configured to support the data transmission apparatus in performing S101 in the foregoing embodiments.

In a possible embodiment, the communication module 113 is further configured to support the data transmission apparatus in performing S105a and S107a performed by the network device in the foregoing embodiments. The processing module 112 is further configured to support the data transmission apparatus in performing S106 performed by the network device in the foregoing embodiments.

For example, when the data transmission apparatus is a terminal device, or is a chip used in the terminal device, In this case, the communication module 113 is configured to support the data transmission apparatus in performing S103 performed by the terminal device in the foregoing embodiments. The processing module 112 is configured to support the data transmission apparatus in performing S104 performed by the terminal device in the foregoing embodiments.

In a possible embodiment, the communication module 113 is further configured to support the data transmission apparatus in performing S105b and S107b performed by the terminal device in the foregoing embodiments.

The processing module 112 may be a processor or a controller. For example, the processing module 112 may be a central processing unit, a general purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in the present invention. Alternatively, the processor may be a combination of processors implementing a computing function, for example, a combination of one or more microprocessors or a combination of a digital signal processor and a microprocessor. The communication module 113 may be a transceiver, a transceiver circuit, a communication interface, or the like. The storage module 111 may be a memory.

Figure 8:
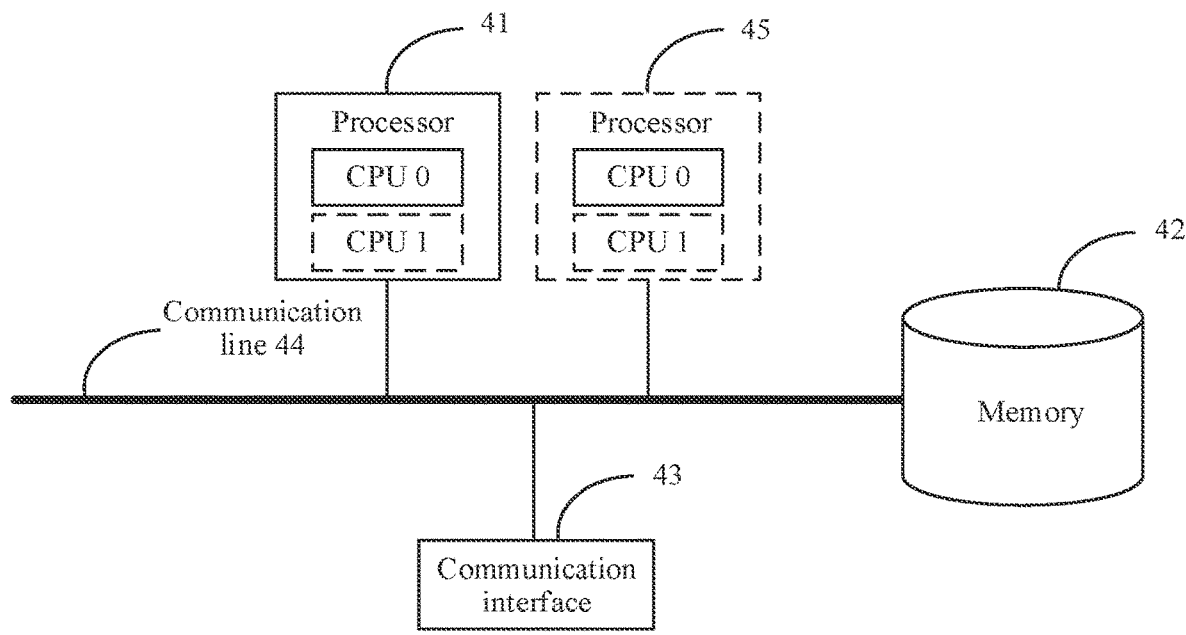
FIG. 8 is a schematic diagram of a structure of a communication device according to an embodiment of this application.

When the processing module 112 is a processor 41 or a processor 45, the communication module 113 is a communication interface 43 or a transceiver, and the storage module 111 is a memory 42, the data transmission apparatus in this application may be a communication device shown in FIG. 8. The communication device includes the processor 41, a communication line 44, and at least one communication interface (in FIG. 8, that the communication device includes the communication interface 43 is merely used as an example for description).

Optionally, the communication device may further include the memory 42.

The processor 41 may be a general-purpose central processing unit (CPU), a microprocessor, an application-specific integrated circuit (ASIC), or one or more integrated circuits configured to control program execution of the solutions in this application.

The communication line 44 may include a path for transferring information between the foregoing components.

The communication interface 43 is any apparatus such as a transceiver, and is configured to communicate with another device or a communication network such as the Ethernet, a radio access network (RAN), or a wireless local area network (WLAN).

The memory 42 may be a read-only memory (ROM) or another type of static storage device that can store static information and instructions, or a random access memory (RAM) or another type of dynamic storage device that can store information and instructions. The memory 42 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of an instruction or a data structure and that is accessible by a computer, but is not limited thereto. The memory may exist independently, and is connected to the processor by using the communication line 44. The memory may alternatively be integrated with the processor.

The memory 42 is configured to store computer-executable instructions for executing the solutions in this application, and the execution is controlled by the processor 41. The processor 41 is configured to execute the computer-executable instructions stored in the memory 42, to implement the data transmission method provided in the following embodiments of this application.

Optionally, the computer-executable instructions in this embodiment of this application may also be referred to as application program code. This is not specifically limited in this embodiment of this application.

During specific implementation, in an embodiment, the processor 41 may include one or more CPUs such as a CPU 0 and a CPU 1 shown in FIG. 8.

During specific implementation, in an embodiment, the communication device may include a plurality of processors such as the processor 41 and the processor 45 in FIG. 8. Each of the processors may be a single-core (single-CPU) processor or a multi-core (multi-CPU) processor. The processor herein may refer to one or more devices, circuits, and/or processing cores configured to process data (for example, computer program instructions).

Figure 9:
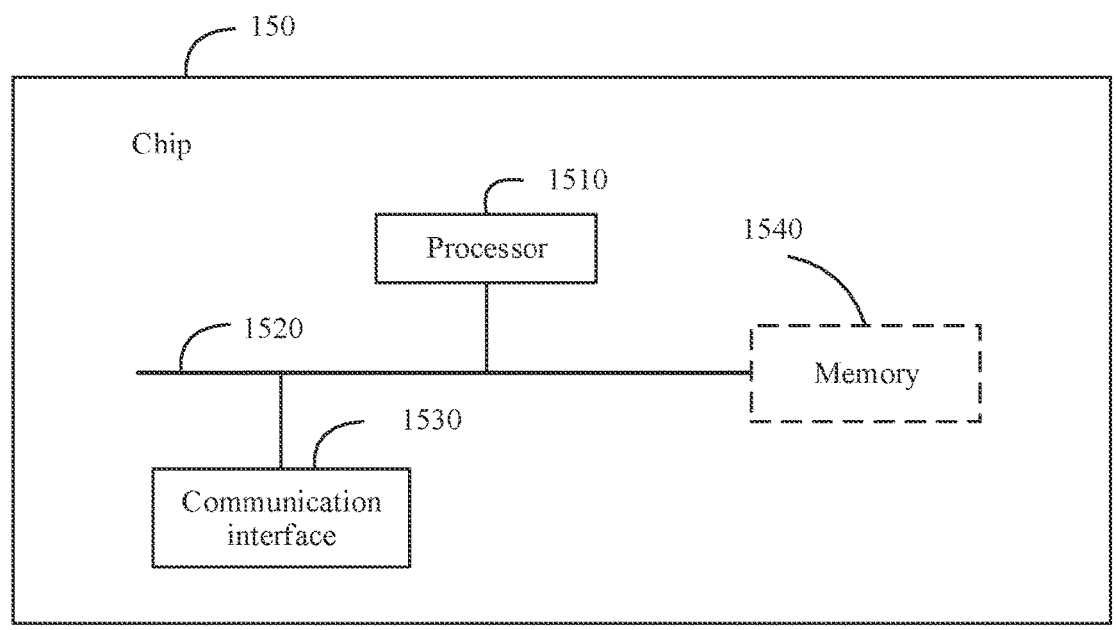
FIG. 9 is a schematic diagram of a structure of a chip according to an embodiment of this application.

FIG. 9 is a schematic diagram of a structure of a chip 150 according to an embodiment of this application. The chip 150 includes one or more (including two) processors 1510 and a communication interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following element: an executable module or a data structure, a subset thereof, or an extended set thereof.

In this embodiment of this application, the operation instructions stored in the memory 1540 (where the operation instructions may be stored in an operating system) are invoked to perform a corresponding operation.

The processor 1510 controls a processing operation of either of a network device and a terminal device, and the processor 1510 may also be referred to as a central processing unit (CPU).

The memory 1540 may include the read-only memory and the random access memory, and provide the instructions and the data for the processor 1510. The part of the memory 1540 may further include the non-volatile random access memory (NVRAM). For example, in an application, the processor 1510, the communication interface 1530, and the memory 1540 are coupled together through a bus system 1520. The bus system 1520 may further include a power bus, a control bus, a status signal bus, and the like in addition to a data bus. However, for clear descriptions, various buses are marked as the bus system 1520 in FIG. 9.

The method disclosed in the foregoing embodiments of this application may be applied to the processor 1510, or may be implemented by the processor 1510. The processor 1510 may be an integrated circuit chip and has a signal processing capability. In an implementation process, the steps in the foregoing method may be implemented by using a hardware integrated logical circuit in the processor 1510, or by using instructions in a form of software. The processor 1510 may be a general-purpose processor, a digital signal processor (DSP), an application specific integrated circuit (ASIC), a field-programmable gate array (FPGA) or another programmable logic device, a discrete gate or a transistor logic device, or a discrete hardware component. The processor 1510 may implement or perform the methods, the steps, and logical block diagrams that are disclosed in the embodiments of this application. The general-purpose processor may be a microprocessor, or the processor may be any conventional processor or the like. Steps of the method disclosed with reference to the embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing method in combination with hardware of the processor 1510.

In a possible implementation, the communication interface 1530 is configured to perform receiving and sending steps of the network device or the terminal device in any one of the foregoing embodiments. The processor 1510 is configured to perform processing steps of the network device or the terminal device in any one of the foregoing embodiments.

The communication unit may be an interface circuit or a communication interface of the apparatus, and is configured to receive a signal from another apparatus. For example, when the apparatus is implemented as a chip, the communication unit is an interface circuit or a communication interface that is of the chip and that is configured to receive a signal from another chip or apparatus or send a signal.

In the foregoing embodiments, the instructions that are stored in the memory and that are to be executed by the processor may be implemented in a form of a computer program product. The computer program product may be written to the memory in advance, or may be downloaded in a form of software and installed in the memory.

The computer program product includes one or more computer instructions. When computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, SSD), or the like.

According to an aspect, a computer-readable storage medium is provided. The computer-readable storage medium stores instructions. When the instructions are run, a network device or a chip used in the network device is enabled to perform S101 and S102 in the embodiments.

According to another aspect, a computer-readable storage medium is provided. The computer-readable storage medium stores instructions. When the instructions are run, a network device or a chip used in the network device is enabled to perform S105a, S106, and S107a in the embodiments.

According to still another aspect, a computer-readable storage medium is provided. The computer-readable storage medium stores instructions. When the instructions are run, a terminal device or a chip used in the terminal device is enabled to perform S103 and S104 in the embodiments.

According to another aspect, a computer-readable storage medium is provided. The computer-readable storage medium stores instructions. When the instructions are run, a terminal device or a chip used in the terminal device is enabled to perform S105b and S107b in the embodiments.

The foregoing readable storage medium may include: any medium that can store program code, such as a USB flash drive, a removable hard disk, a read-only memory, a random access memory, a magnetic disk, or an optical disc.

According to an aspect, a computer program product including instructions is provided. The computer program product stores the instructions. When the instructions are run, a network device or a chip used in the network device is enabled to perform S101 and S102 in the embodiments.

According to another aspect, a computer program product including instructions is provided. The computer program product stores the instructions. When the instructions are run, a network device or a chip used in the network device is enabled to perform S105a, S106, and S107a in the embodiments.

According to still another aspect, a computer program product including instructions is provided. The computer program product stores the instructions. When the instructions are run, a terminal device or a chip used in the terminal device is enabled to perform S103 and S104 in the embodiments.

According to yet another aspect, a computer program product including instructions is provided. The computer program product stores the instructions. When the instructions are run, a terminal device or a chip used in the terminal device is enabled to perform S105b and S107b in the embodiments.

According to an aspect, a chip is provided. The chip is used in a network device. The chip includes at least one processor and a communication interface. The communication interface is coupled to the at least one processor. The processor is configured to run instructions, to perform S101 and S102 in the embodiments.

According to another aspect, a chip is provided. The chip is used in a network device. The chip includes at least one processor and a communication interface. The communication interface is coupled to the at least one processor. The processor is configured to run instructions, to perform S105a, S106, and S107a in the embodiments.

According to an aspect, a chip is provided. The chip is used in a terminal device. The chip includes at least one processor and a communication interface. The communication interface is coupled to the at least one processor. The processor is configured to run instructions, to enable the terminal device or the chip used in the terminal device to perform S103 and S104 in the embodiments.

According to another aspect, a chip is provided. The chip is used in a terminal device. The chip includes at least one processor and a communication interface. The communication interface is coupled to the at least one processor. The processor is configured to run instructions, to perform S105b and S107b in the embodiments.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (SSD for short)), or the like.

Although this application is described with reference to the embodiments herein, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions listed in the claims. Some measures are recorded in dependent claims that are different from each other, but this does not mean that the measures cannot be combined to produce a good effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and are considered as any of and all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A data transmission method, comprising:
   determining, by a network device, first downlink control information;
   sending, by the network device, first information to n terminal devices, wherein the first information comprises a first correspondence table, the first correspondence table comprises a correspondence between at least one first sequence value, at least one second sequence value, and a DMRS antenna port, the at least one first sequence value comprises index values of demodulation reference signal (DMRS) antenna port combinations corresponding to the n terminal devices, and the at least one second sequence value comprises index values indicating pairing sequences of the n terminal devices; and
   sending, by the network device, the first downlink control information to the n terminal devices, wherein the first downlink control information indicates the n terminal devices to perform data transmission, and n is an integer greater than or equal to 2.

2. The method according to claim 1, wherein:
   the first downlink control information comprises demodulation reference signal (DMRS) antenna port indication information, and the DMRS antenna port indication information indicates a first sequence value corresponding to the n terminal devices.

3. The method according to claim 1, wherein the method further comprises:
   sending, by the network device, second information to the n terminal devices, wherein the second information comprises a value of n and a total quantity of layers of data on which the n terminal devices perform parallel transmission, the second information is used by the n terminal devices to determine the first correspondence table based on a predefined first relationship table set, and the predefined first relationship table set comprises at least one first correspondence table.

4. The method according to claim 1, wherein the method further comprises:
   sending, by the network device, first indication information to the n terminal devices, wherein the first indication information indicates a second sequence value corresponding to each of the n terminal devices.

5. A data transmission method, comprising:
   receiving, by a terminal device, first downlink control information from a network device, wherein the first downlink control information indicates n terminal devices to perform data transmission, n is an integer greater than or equal to 2, and the terminal device is one of the n terminal devices;
   receiving, by the terminal device, first information from the network device, wherein the first information comprises a first correspondence table, and the first correspondence table comprises a correspondence between at least one first sequence value, at least one second sequence value, and a DMRS antenna port, the at least one first sequence value comprises index values of demodulation reference signal (DMRS) antenna port combinations corresponding to the n terminal devices, and the at least one second sequence value comprises index values indicating pairing sequences of the n terminal devices; and
   performing, by the terminal device, data transmission with the network device based on the first downlink control information.

6. The method according to claim 5, wherein:
   the first downlink control information comprises demodulation reference signal (DMRS) antenna port indication information, and the DMRS antenna port indication information indicates a first sequence value corresponding to the n terminal devices.

7. The method according to claim 5, wherein the method further comprises:
receiving, by the terminal device, second information from the network device, wherein the second information comprises a value of n and a total quantity of layers of data on which the n terminal devices perform parallel transmission; and
determining, by the terminal device, the first correspondence table in a predefined first relationship table set based on the second information.

8. The method according to claim 5, wherein the method further comprises:
receiving, by the terminal device, first indication information from the network device, wherein the first indication information indicates a second sequence value corresponding to each of the n terminal devices; and
determining, by the terminal device in the first correspondence table based on the first sequence value and the second sequence value, a DMRS antenna port corresponding to the terminal device.

9. A data transmission apparatus, comprising:
one or more processors; and
a non-transitory computer readable memory, storing computer-executable instructions that, when executed by the one or more processors, cause the data transmission apparatus to perform operations comprising:
determining first downlink control information;
sending first information to n terminal devices, wherein the first information comprises a first correspondence table, the first correspondence table comprises a correspondence between at least one first sequence value, at least one second sequence value, and a DMRS antenna port, the at least one first sequence value comprises index values of demodulation reference signal (DMRS) antenna port combinations corresponding to the n terminal devices, and the at least one second sequence value comprises index values indicating pairing sequences corresponding to the n terminal devices; and
sending the first downlink control information to the n terminal devices, wherein the first downlink control information indicates the n terminal devices to perform data transmission, and n is an integer greater than or equal to 2.

10. The apparatus according to claim 9, wherein:
the first downlink control information comprises demodulation reference signal (DMRS) antenna port indication information, and the DMRS antenna port indication information indicates a first sequence value corresponding to the n terminal devices.

11. The apparatus according to claim 9, wherein the operations further comprise:
sending second information to the n terminal devices, wherein the second information comprises a value of n and a total quantity of layers of data on which the n terminal devices perform parallel transmission, the second information is used by the n terminal devices to determine the first correspondence table based on a predefined first relationship table set, and the predefined first relationship table set comprises at least one first correspondence table.

12. The apparatus according to claim 9, wherein the operations further comprise:
sending first indication information to the n terminal devices, wherein the first indication information indicates a second sequence value corresponding to each of the n terminal devices.

13. A data transmission apparatus, comprising:
one or more processors; and
a non-transitory computer readable memory storing computer-executable instructions that, when executed by the one or more processors, cause the data transmission apparatus to perform operations comprising:
receiving first downlink control information from a network device, wherein the first downlink control information comprises information for n terminal devices to perform data transmission, n is an integer greater than or equal to 2, and the data transmission apparatus is one of the n terminal devices;
receiving first information from the network device, wherein the first information comprises a first correspondence table, and the first correspondence table comprises a correspondence between at least one first sequence value, at least one second sequence value, and a DMRS antenna port, the at least one first sequence value comprises index values of demodulation reference signal (DMRS) antenna port combinations corresponding to the n terminal devices, and the at least one second sequence value comprises index values indicating pairing sequences of the n terminal devices; and
performing data transmission with the network device based on the first downlink control information.

14. The apparatus according to claim 13, wherein:
the first downlink control information comprises demodulation reference signal (DMRS) antenna port indication information, and the DMRS antenna port indication information indicates a first sequence value corresponding to the n terminal devices.

15. The apparatus according to claim 13, wherein the operations further comprise:
receiving second information from the network device, wherein the second information comprises a value of n and a total quantity of layers of data on which the n terminal devices perform parallel transmission; and
determining the first correspondence table in a predefined first relationship table set based on the second information, wherein the predefined first relationship table set comprises at least one first correspondence table.

16. The apparatus according to claim 13, wherein the operations further comprise:
receiving first indication information from the network device, wherein the first indication information indicates a second sequence value corresponding to each of the n terminal devices; and
determining, in the first correspondence table based on the first sequence value and the second sequence value, a DMRS antenna port corresponding to the data transmission apparatus.

* * * * *